United States Patent
Bodson et al.

(10) Patent No.: US 10,269,073 B1
(45) Date of Patent: Apr. 23, 2019

(54) SYSTEMS AND METHODS FOR INTERPRETING EXCHANGE DATA PACKETS USING A LOOKUP TABLE

(71) Applicant: Arbitrage Technologies, San Francisco, CA (US)

(72) Inventors: J C Bodson, San Francisco, CA (US); Dorine Bodson, San Francisco, CA (US)

(73) Assignee: Arbitrage Technologies, San Francisco, CA (US)

( * ) Notice: Subject to any disclaimer, the term of this patent is extended or adjusted under 35 U.S.C. 154(b) by 0 days.

(21) Appl. No.: 15/940,752

(22) Filed: Mar. 29, 2018

(51) Int. Cl.
*G06Q 40/04* (2012.01)
*H04L 29/06* (2006.01)
*G06F 16/901* (2019.01)

(52) U.S. Cl.
CPC ......... *G06Q 40/04* (2013.01); *G06F 16/9017* (2019.01); *H04L 69/08* (2013.01)

(58) Field of Classification Search
CPC .................................................... G06Q 40/04
USPC ........................................................ 705/37
See application file for complete search history.

(56) References Cited

U.S. PATENT DOCUMENTS

| | | | | |
|---|---|---|---|---|
| 5,557,780 A * | 9/1996 | Edwards | ............. | G06F 17/2264 703/27 |
| 6,803,854 B1 * | 10/2004 | Adams | .................... | G08G 1/127 340/425.5 |
| 8,548,900 B1 * | 10/2013 | Glackin | ................. | G06Q 40/06 705/37 |
| 2003/0069848 A1 * | 4/2003 | Larson | .................... | H04L 41/22 705/50 |
| 2008/0319891 A1 | 12/2008 | Scheinberg et al. | | |
| 2009/0327116 A1 * | 12/2009 | Cunningham | ......... | G06Q 40/04 705/37 |
| 2010/0257251 A1 * | 10/2010 | Mooring | ................. | H04W 4/21 709/216 |

(Continued)

OTHER PUBLICATIONS

CME Group "CME Group Customer Forum" Powerpoint Presentation, pp. 1-74 (2016).

(Continued)

*Primary Examiner* — Jessica Lemieux
(74) *Attorney, Agent, or Firm* — Morgan Lewis & Bockius LLP

(57) ABSTRACT

Systems and methods for interpreting exchange data include an exchange implemented according to a protocol. The exchange includes various exchange elements. Responsive to a request from a first remote source, use a dynamically updated lookup table, which includes descriptors for each element, provided from a second remote source. Translate the request, which is formatted according to a first grammar of a first client language, into a query, which is formatted according to a second grammar associated with the protocol, for corresponding elements. Use the query to obtain various data packets responsive to the request and encoded according to the protocol. Translate the various packets into a programming language according to a third grammar, dictated by the request. Translate data, using the table, in the various packets from the second to the third grammar. Form a translated construct for the various packets that includes the requested information. Communicate the construct to the first source.

29 Claims, 16 Drawing Sheets

(56) References Cited

U.S. PATENT DOCUMENTS

| 2015/0032590 | A1* | 1/2015 | Fay | G06Q 40/04 |
| | | | | 705/37 |
| 2016/0275606 | A1* | 9/2016 | Aravala | G06Q 40/04 |
| 2018/0191624 | A1* | 7/2018 | Haynold | H04L 47/283 |
| 2018/0196647 | A1* | 7/2018 | Batinich | G06F 9/541 |

OTHER PUBLICATIONS

Fields "Notice of Proposed Commission Interpretation Regarding Automated Quotations Under Regulation NMS" Securities and Exchange Commission, Release No. 34-77407, File No. S7-03-16 (2016).

Harts "Rapid trading aids investors: Opposing view" USA Today, www.usatoday.com/story/opinion/2016/06/15/high-frequency-trading-iex-editorials-debates/85952068/, pp. 1-2 (2016).

Kim "Electronic and Algorithmic Trading Technology: The Complete Guide" 1st Edition, Academic Press, pp. 224 (2007).

Madhavan "VWAP Strategies" Investment Guides, vol. 1, pp. 32-38 (2002).

Osipovich "Steven Cohen Targets High-Frequency Trading With 'Dark Pool' Venture" The Wall Street Journal, https://www.wsj.com/articles/steven-cohen-targets-high-frequency-trading-with-dark-pool-venture-1523994344, pp. 1-3 (2018).

The Editorial Board "Slow down high-speed traders: Our view" USA Today, https://www.usatoday.com/story/opinion/2016/06/15/sec-high-frequency-trading-investors-exchange-iex-editorials-debates/85893490/, pp. 1-3 (2016).

* cited by examiner

```
┌─ 616
│ Responsive to a first client request, from a first source remote from the first
│ computer system, use a dynamically updated lookup table provided from a second
│ source other than the first source. The dynamically updated lookup table includes a
│ respective descriptor for each exchange element in at least a subset of the plurality
│ of exchange elements of the first exchange protocol, thereby translating the first
│ client request into a first query for one or more exchange elements in the plurality
│ of exchange elements. The first client request is formatted in accordance with a
│ first grammar of a first client language and the first query is formatted in
│ accordance with a second grammar associated with the first exchange protocol.
```
                                                                                    ─ 618
  ┌ The first client request is in the form of an application programming interface ┐
  │ call.                                                                            │
                                                                                    ─ 620
  ┌ The first client request comprises a request to enter an order, a request to    ┐
  │ modify an order, a request to cancel an order, or a combination thereof.         │
                                                                                    ─ 622
  ┌ Updating the dynamically updated lookup table on a recurring basis to reflect    ┐
  │ changes in the second grammar over time.                                         │
                                                                                    ─ 624
  │   ┌ The recurring basis is a predetermined time interval.                    ┐   │

─ 626
  ┌ Using the dynamically updated lookup table comprises providing a plain text     ┐
  │ version of the message in the form of the first translated data construct.       │
                                                                                    ─ 628
  ┌ Using the dynamically updated lookup table comprises providing a                ┐
  │ decompiled version of the message in the form of the first translated data       │
  │ construct.                                                                       │
                                                                                    ─ 630
  ┌ Using the dynamically updated lookup table comprises providing a                ┐
  │ summarized version of the message in the form of the first translated data       │
  │ construct.                                                                       │
                                                                                    ─ 632
  ┌ The dynamically updated lookup table is updated in response to an update of     ┐
  │ the first exchange protocol                                                      │
                                                                                    ─ 634
  ┌ The dynamically updated lookup table is updated in response to an update of     ┐
  │ the first exchange protocol without altering the first grammar of the first      │
  │ client language.                                                                 │
                                                                                    ─ 636
  ┌ The first source is selected from the group consisting of a smartphone, a       ┐
  │ smartwatch, a personal digital assistant (PDA), an enterprise digital assistant, │
  │ a tablet computer, and a desktop computer.                                       │

Fig. 6B

```
1   package tech.arbitrage.cme.mdp3.messages_v5;
2
3   import tech.arbitrage.cme.mdp3.CME_Message;
4   import tech.arbitrage.cme.mdp3.CME_Types;
5   import java.io.*;
6
7   public class MDIncrementalRefreshBook32
8       extends CME_Message
9   {
10      public long TransactTime ;
11      public byte MatchEventIndicator ;
12
13
14      Object[] _attributeValues;
15      public
16      Object[] getAttributeValues() { return _attributeValues ; }
17      public
18      Object[] getAttributeKeys() { return Attributes.values() ; }
19
20      enum Attributes
21      { Reserved
22      , TransactTime
23      , MatchEventIndicator
24
25      }
26
27      CME_Message.Group[] _groups;
28      public
29      CME_Message.Group[] getGroups() { return _groups ; }
30
31      enum Groups
32      { Reserved
33      , NoMDEntries
34      }
35
36      MDIncrementalRefreshBook32()
37      {
38          _attributeValues = new Object[ Attributes.values().length ] ;
39          _groups = new CME_Message.Group[ Groups.values().length ] ;
40      }
41
42      public
43      void readBlock( byte[] bytes , int base_offset , int block_length , boolean
44  printout )
45              throws IOException
46      {
47          if ( printout ) System.out.println( "#CME Message Body - FIX Message -
48  MDIncrementalRefreshBook32 ..." );
49
50          int offset = 0;
51          _attributeValues[ Attributes.TransactTime.ordinal() ] =
52  CME_Types.ReadLlong( bytes , base_offset + 0 , 8 ) ;
53          if ( printout ) System.out.println( "TransactTime = " + _attributeValues[
54  Attributes.TransactTime.ordinal() ] + " ..." ) ;
55          _attributeValues[ Attributes.MatchEventIndicator.ordinal() ] =
56  CME_Types.ReadLbyte( bytes , base_offset + 8 , 1 ) ;
```

Fig. 7A

```
57      if ( printout ) System.out.println( "MatchEventIndicator = " +
58  _attributeValues[ Attributes.MatchEventIndicator.ordinal() ] + " ..." ) ;
59
60
61      if ( block_length != 11 ) if ( printout ) System.out.println( "\"Warning:
62  template\'s blockLength expects 11, stream value is " + block_length + ",
63  please verify the template/stream versions ...\"" );
64
65      offset = block_length ;
66
67      if ( printout ) System.out.println( "#CME Message body block_length=" +
68  offset + ", data length left = ? ..." ) ;
69
70      NoMDEntries aNoMDEntries = new NoMDEntries( bytes , base_offset + offset
71  , 3 , printout );
72      aNoMDEntries.readBlocks( bytes , base_offset + offset + 3 ,
73  aNoMDEntries.blockLength , printout );
74      _groups[ Groups.NoMDEntries.ordinal() ] = aNoMDEntries ;
75      offset += ( 3 + aNoMDEntries.length() ) ;
76
77
78      if ( printout ) System.out.println( "#CME Message body end offset=" +
79  offset + ", remaining packet length = ? ..." ) ;
80      }
81
82
83    public
84    static
85    class NoMDEntries
86         extends CME_Types.CME_MessageGroup
87    {
88      GroupBlock[] _groupBlocks;
89
90
91      NoMDEntries( byte[] bytes , int base_offset , int block_length , boolean
92  printout )
93      {
94        int offset = 0 ;
95        blockLength = CME_Types.ReadLshort( bytes , base_offset + offset , 2 )
96  ;
97        if ( printout ) System.out.println( "NoMDEntries.blockLength=" +
98  blockLength + " ..." ) ;
99        offset += 2 ;
100       numInGroup = CME_Types.ReadLbyte( bytes , base_offset + offset , 2 ) ;
101       if ( printout ) System.out.println( "NoMDEntries.numInGroup=" +
102  numInGroup + " ..." ) ;
103       offset += 1 ;
104       if ( blockLength != 32 ) if ( printout ) System.out.println (
105  "\"Warning: template\'s blockLength expects 32, stream value is " +
106  blockLength + ", please verify the template/stream versions ...\"" ) ;
107
108       if ( numInGroup > 0 )
109          _groupBlocks = new GroupBlock[numInGroup+1] ;
110
111       }
112
113       public
```

Fig. 7B

```
114      static
115      class GroupBlock
116          extends CME_Message.Group.Block
117      {
118        public long MDEntryPx;
119        public int MDEntrySize; size"
120        public int SecurityID;
121        public int RptSeq;
122        public int NumberOfOrders;
123        public byte MDPriceLevel;
124        public byte MDUpdateAction;
125        public byte MDEntryType;
126        Object[] _attributeValues;
127        public
128        Object[] getAttributeValues() { return _attributeValues ; }
129        public
130        Object[] getAttributeKeys() { return Attributes.values() ; }
131
132        enum Attributes
133        { Zero
134        , MDEntryPx
135        , MDEntrySize         , SecurityID
136        , RptSeq
137        , NumberOfOrders
138        , MDPriceLevel
139        , MDUpdateAction
140        , MDEntryType
141        }
142
143        GroupBlock()
144        {
145           _attributeValues = new Object[ Attributes.values().length ] ;
146        }
147
148        public
149        void readBlock( byte[] bytes , int base_offset , int block_length ,
150   boolean printout )
151             throws IOException
152        {
153           int offset = 0 ;
154           _attributeValues[ Attributes.MDEntryPx.ordinal() ] =
155   CME_Types.ReadLlong( bytes , base_offset + 0 , 8 ) ;
156           if ( printout ) System.out.println( "MDEntryPx=" + _attributeValues[
157   Attributes.MDEntryPx.ordinal() ] + " ..." ) ;
158           _attributeValues[ Attributes.MDEntrySize.ordinal() ] =
159   CME_Types.ReadLint( bytes , base_offset + 8 , 4 ) ;
160           if ( printout ) System.out.println( "MDEntrySize=" +
161   _attributeValues[ Attributes.MDEntrySize.ordinal() ] + " ..." ) ;
162           _attributeValues[ Attributes.SecurityID.ordinal() ] =
163   CME_Types.ReadLint( bytes , base_offset + 12 , 4 ) ;
164           if ( printout ) System.out.println( "SecurityID=" + _attributeValues[
165   Attributes.SecurityID.ordinal() ] + " ..." ) ;
166           _attributeValues[ Attributes.RptSeq.ordinal() ] = CME_Types.ReadLint(
167   bytes , base_offset + 16 , 4 ) ;
168           if ( printout ) System.out.println( "RptSeq=" + _attributeValues[
169   Attributes.RptSeq.ordinal() ] + " ..." ) ;
```

Fig. 7C

```
170         _attributeValues[ Attributes.NumberOfOrders.ordinal() ] =
171 CME_Types.ReadLint( bytes , base_offset + 20 , 4 ) ;
172         if ( printout ) System.out.println( "NumberOfOrders=" +
173 _attributeValues[ Attributes.NumberOfOrders.ordinal() ] + " ..." ) ;
174         _attributeValues[ Attributes.MDPriceLevel.ordinal() ] =
175 CME_Types.ReadLbyte( bytes , base_offset + 24 , 1 ) ;
176         if ( printout ) System.out.println( "MDPriceLevel=" +
177 _attributeValues[ Attributes.MDPriceLevel.ordinal() ] + " ..." ) ;
178         _attributeValues[ Attributes.MDUpdateAction.ordinal() ] =
179 CME_Types.ReadLbyte( bytes , base_offset + 25 , 1 ) ;
180         if ( printout ) System.out.println( "MDUpdateAction=" +
181 _attributeValues[ Attributes.MDUpdateAction.ordinal() ] + " ..." ) ;
182         _attributeValues[ Attributes.MDEntryType.ordinal() ] =
183 CME_Types.ReadLbyte( bytes , base_offset + 26 , 1 ) ;
184         if ( printout ) System.out.println( "MDEntryType=" +
185 _attributeValues[ Attributes.MDEntryType.ordinal() ] + " ..." ) ;
186       }
187
188     }
189
190     public
191     void readBlocks( byte[] bytes , int base_offset , int block_length ,
192 boolean printout )
193         throws IOException
194     {
195       int offset = base_offset ;
196
197       for( int i = 0 ; i < numInGroup ; i++ )
198       {
199         GroupBlock newBlock = new GroupBlock();
200         newBlock.readBlock( bytes, offset , block_length , printout );
201         _groupBlocks[ i + 1 ] = newBlock ;
202
203         offset += blockLength ;
204       }
205     }
206
207     public
208
209     Block[] getGroupBlocks()
210     {
211       return _groupBlocks;
212     }
213   }
214 }
```

Fig. 7D

MDInstrumentDefinitionOption4

806 —

- + MatchEventIndicator: Byte [1]
- + TotNumReports: Integer [1]
- + SecurityUpdateAction: Byte [1]
- + LastUpdateTime: Long [1]
- + MDSecurityTradingStatus: Byte [1]
- + ApplID: Short [1]
- + MarketSegmentID: Byte [1]
- + UnderlyingProduct: Byte [1]
- + SecurityExchange: Byte [*]
- + SecurityGroup: Byte [*]
- + Asset: Byte [*]
- + Symbol: Byte [*]
- + SecurityID: Integer [1]
- + SecurityType: Byte [*]
- + CFICode: Byte [*]
- + PutOrCall: Byte [1]
- + MaturityMonthYear: Byte [*]
- + Currency: Byte [*]
- + StrikePrice: Long [1]
- + StrikeCurrency: Byte [*]
- + SettlCurrency: Byte [*]
- + MinCabPrice: Long [1]
- + MatchAlgorithm: Byte [1]
- + MinTradeVol: Integer [1]
- + MaxTradeVol: Integer [1]
- + MinPriceIncrement: Long [1]
- + MinPriceIncrementAmount: Long [1]
- + DisplayFactor: Long [1]
- + TickRule: Byte [1]
- + MainFraction: Byte [1]
- + SubFraction: Byte [1]
- + PriceDisplayFormat: Byte [1]
- + UnitOfMeasure: Byte [*]
- + UnitOfMeasureQty: Long [1]
- + TradingReferencePrice: Long [1]
- + SettlPriceType: Byte [1]
- + ClearedVolume: Integer [1]
- + OpenInterestQty: Integer [1]
- + LowLimitPrice: Long [1]
- + HighLimitPrice: Long [1]
- + UserDefinedInstrument: Byte [1]
- + TradingReferenceDate: Short [1]

NoEvents
NoMDFeedTypes
NoInstAttrib
NoLotTypeRules
NoUnderlyings

MDInstrumentDefinitionFuture2

808 —

- + MatchEventIndicator: Byte [1]
- + TotNumReports: Integer [1]
- + SecurityUpdateAction: Byte [1]
- + LastUpdateTime: Long [1]
- + MDSecurityTradingStatus: Byte [1]
- + ApplID: Short [1]
- + MarketSegmentID: Byte [1]
- + UnderlyingProduct: Byte [1]
- + SecurityExchange: Byte [*]
- + SecurityGroup: Byte [*]
- + Asset: Byte [*]
- + Symbol: Byte [*]
- + SecurityID: Integer [1]
- + SecurityType: Byte [*]
- + CFICode: Byte [*]
- + MaturityMonthYear: Byte [*]
- + Currency: Byte [*]
- + SettlCurrency: Byte [*]
- + MatchAlgorithm: Byte [1]
- + MinTradeVol: Integer [1]
- + MaxTradeVol: Integer [1]
- + MinPriceIncrement: Long [1]
- + DisplayFactor: Long [1]
- + MainFraction: Byte [1]
- + SubFraction: Byte [1]
- + PriceDisplayFormat: Byte [1]
- + UnitOfMeasure: Byte [*]
- + UnitOfMeasureQty: Long [1]
- + TradingReferencePrice: Long [1]
- + SettlPriceType: Byte [1]
- + OpenInterestQty: Integer [1]
- + ClearedVolume: Integer [1]
- + HighLimitPrice: Long [1]
- + LowLimitPrice: Long [1]
- + MaxPriceVariation: Long [1]
- + DecayQuantity: Integer [1]
- + DecayStartDate: Short [1]
- + OriginalContractSize: Integer [1]
- + ContractMultiplier: Integer [1]
- + ContractMultiplierUnit: Byte [1]
- + FlowScheduleType: Byte [1]
- + MinPriceIncrementAmount: Long [1]
- + UserDefinedInstrument: Byte [1]
- + TradingReferenceDate: Short [1]

NoEvents
NoMDFeedTypes
NoInstAttrib
NoLotTypeRules

Fig. 8B

SYSTEMS AND METHODS FOR INTERPRETING EXCHANGE DATA PACKETS USING A LOOKUP TABLE

TECHNICAL FIELD

The present disclosure relates to systems and methods for interpreting exchange data packets. More particularly, the present disclosure relates to system and methods for interpreting exchange data packets using a dynamically updated lookup table.

BACKGROUND

Electronic exchanges have revolutionized how securities are digitally traded. Traditional trading pits and floors have been replaced by electronic and algorithmic trading, enabling everyday persons to become market participants. Faster networking speeds through financial engineering have enabled the creation of automated model-based trading algorithms (Kim, 2007, "Electronic and Algorithmic Trading Technology: The Complete Guide," Elsevier Inc., print). However, algorithmic trading has prohibited typical market participants from capitalizing on potential revenues.

To consider the depth and complexity of algorithmic trading, consider high frequency trading. With high frequency trading, when a market participant places an order for a security, that order must be communicated through a variety of trading intermediaries, such as a brokerage firm, as well as various technical intermediaries, including a trading platform interface. Each intermediate communication requires an internal delay, typically in the form of data transfers and communications between systems, which naturally results in a corresponding latency. This latency extends a total time required to execute the order. When latency occurs in executing an order, the price of the security when the order is executed changes and, more likely than not, does not equal the price of the security when the order was initiated, creating a price transformation discrepancy. This price transformation discrepancy exists because market prices adjust in real time, yet orders must be communicated through a variety of channels, each of which takes a fraction of second to execute. Brokers and intermediate agents are able to capitalize and profit off the price transformation discrepancy of an order, potentially earning approximately 0.001 USD per order. While this potential earning appears insignificant, these fractions of a penny accumulate over multitudes of executed orders.

According to Bloomberg, high frequency trades accounted for approximately sixty percent of all U.S. equity volume in 2010. See, the Internet at bloomberg.com/news/articles/2013-06-06/how-the-robots-lost-high-frequency-tradings-rise-and-fall, accessed Feb. 20, 2018. However, these high frequency trades do not act as market participants. Thus, the added value to a market is negligible. They are often seen as a detriment because their participation does not directly affect the given market prices.

Limiting high frequency trading has been theorized but never attempted on mass scale. One proposed limitation to high frequency trading is to require that such trades traverse across a coil of cable approximately thirty-five miles in length. Such a cable would slow the time required to communicate quotes and trades to and/or from market participants by a standard time period of approximately 350 milliseconds thereby putting high frequency traders on the same playing field as conventional traders. The drawback with such approaches to ensuring that order executions occur over a standard time period, is that they only protect market participants from a fraction of a variety of latency related problems. For instance, such approaches do not address other existing latency discrepancies between the market participant and the exchange.

Given the above background, what is needed in the art are improved, more efficient, ways to interpret exchange data packets communicated between a market participant and an electronic exchange.

The information disclosed in this Background of the Invention section is only for enhancement of understanding of the general background of the invention and should not be taken as an acknowledgement or any form of suggestion that this information forms the prior art already known to a person skilled in the art.

SUMMARY

Advantageously, the systems and methods for interpreting exchange data packets using a lookup table detailed in the present disclosure address the shortcomings discussed above.

Accordingly, various aspects of the present disclosure are directed to providing systems and methods for interpreting exchange data packets using a dynamically updated lookup table.

One aspect of the present disclosure provides a computer implemented method for interpreting exchange data packets using a lookup table. The method comprises an electronic exchange operated on a first computer system. The electronic exchange is implemented in accordance with a first exchange protocol. The first exchange protocol includes a plurality of exchange elements (e.g., options exchange elements or futures exchange elements).

A first client request is received from a first source remote from the first computer system. Responsive to this, the method uses a dynamically updated lookup table in accordance with the client request. The dynamically updated lookup table is provided from a second source other than the first source. The dynamically updated lookup table includes a respective descriptor for each exchange element (e.g., currency type or trading symbol). In some instances, each exchange element is in a subset of exchange elements (e.g., event exchange elements). The client request is translated into a query for one or more exchange elements (e.g., a request for price data of a security). The client request is formatted in accordance with a first grammar of a first client language (e.g., formatted in an application programming interface call). The first query is formatted in accordance with a second grammar associated with the first exchange protocol (e.g. formatted in FIX).

Additionally, the first query is utilized to obtain market feed data packets, what are responsive to the first client request. The market feed data packets are encoded in accordance with the first exchange protocol (e.g., encoded in accordance with FIX).

The market feed data packets are translated into a first programming language in accordance with a third grammar (e.g., translated into C++). The first programming language is dictated by the first client request. The dynamically updated lookup table is utilized to translate data in the market feed data packets from the second grammar to the third grammar, forming a first translated data construct for the market feed data packets. The translated data construct includes information requested by the first client request. The translated data construct is communicated to the first source.

In some embodiments, the electronic exchange is a commodities exchange, a cryptocurrency exchange, a currency exchange, a dark pool, an energy exchange, an electronic communication network, a foreign exchange, a real estate exchange, a stock exchange, market participants, or an alternative investment exchange.

In some embodiments, a client request is an order or a trade (e.g., a request to market order ten shares of a security).

In some embodiments, a number of trades or a number of quotes executed in an hour is approximately $10^6$ or greater executions. In some embodiments, a number of trades or a number of quotes executed in an hour is approximately $10^9$ or greater executions. In some embodiments, a number of trades or a number of quotes executed in an hour is approximately $10^3$ or greater executions.

In some embodiments, a number of trades executed in a day is approximately $10^6$ or greater trades. In some embodiments, a number of trades executed in a day is approximately $10^9$ or greater trades. In some embodiments, a number of trades executed in a day is approximately $10^3$ or greater trades.

In some embodiments, a number of trades executed in a minute is approximately $10^6$ or greater trades. In some embodiments, a number of trades executed in a minute is approximately $10^3$ or greater trades. In some embodiments, a number of trades executed in a minute is approximately $10^2$ or greater trades.

In some embodiments, a ratio of a number of orders executed in a day compared to a number of trades executed in a day is approximately 100:1 or less. In some embodiments, a ratio of a number of orders executed in a day compared to a number of trades executed in a day is approximately 250:1 or less. In some embodiments, a ratio of a number of orders executed in a day compared to a number of trades executed in a day is approximately 50:1 or less.

In some embodiments, the first client request is in the form of an application programming interface (API) call.

In some embodiments, the first exchange protocol is a financial information exchange (FIX) protocol or a FIX Adapted for Streaming (FAST) protocol. The FIX protocol and the FAST protocol each define a message header, a simple binary header, and a FIX message body.

In some embodiments, the first exchange protocol is a market data platform (MDP). A market feed data packet in the first plurality of market feed data packets comprises a message. The message includes event-based bid data, ask data, trade data, statistical data, or a combination thereof.

In some embodiments, the plurality of exchange elements comprises a plurality of types. The plurality of types comprises one or more of the group consisting of currency type, trading symbol, quantity type, price type, security exchange type, text type, and group-size type.

In some embodiments, at least one market feed data packet in the first plurality of market feed data packets comprises a message of the MDP. In some embodiments, at least one market feed data packet in the first plurality of market feed data packets comprises a plurality of messages of the MDP. In some embodiments, at least two market feed data packets in the first plurality of market feed data packets collectively comprise a single event over the at least two market feed data packets. Each market feed data packet in the at least two market feed data packets comprises a complete message as defined by the FIX protocol of the MDP.

In some embodiments, using the dynamically updated lookup table comprises providing a plain text version of the message in the form of the first translated data construct (e.g., the first translated data construct states "The price of security Y is Z U.S. dollars per share"). In some embodiments, using the dynamically updated lookup table comprises providing a decompiled version of the message in the form of the first translated data construct (e.g., the first translated data construct states an array or matrix of information). In some embodiments, using the dynamically updated lookup table comprises providing a summarized version of the message in the form of the first translated data construct.

In some embodiments, the message comprises a trade summary message, a limits message, a top of book message, a best bid and ask message, or a combination thereof.

In some embodiments, the respective descriptor for an exchange element of the plurality of exchange elements comprises a futures descriptor, a spread descriptor, or an options descriptor.

In some embodiments, the using and translating collectively comprise commands for receiving a market feed data packet in accordance with the MDP protocol. The market feed data packet is parsed and outputs the imported data from the market feed data packet in the form of the first translated data construct. The first translated data construct is in accordance with one or more templates of the MDP protocol (e.g., in accordance with the fifth template of the MDP protocol).

In some embodiments, the using and translating collectively comprise commands for receiving a market feed data packet in accordance with the MDP protocol. At least a first portion of the dynamically updated lookup table related to the MDP protocol and at least a second portion of the dynamically updated lookup table related to the first client language are imported. The imported data is parsed and output in the form of the first translated data construct.

In some embodiments, the first exchange protocol specifies that the first client connects to and transacts with the electronic exchange by creation of a session. The session is defined by a password, at least one Internet Protocol (IP) address, a port, a market identifier, and a sender identifier. A message is an administrative message configured to support connectivity between the first client and the electronic exchange, or the message is an application message configured to support transactions on the electronic exchange.

In some embodiments, the first client request comprises a request to enter an order, a request to execute an order, a request to modify an order, a request to cancel an order, or a combination thereof.

In some embodiments, the using and translating collectively comprise commands for receiving a market feed data packet formatted in accordance with the first exchange protocol. The commands include importing at least a first portion of the dynamically updated lookup table related to a second exchange protocol, which is different than the first exchange protocol. The commands also include importing at least a second portion of the dynamically updated lookup table related to the first client language. The imported data is parsed and output in the form of the first translated data construct.

In some embodiments, the first exchange protocol is DropCopy. DropCopy specifies that a message is an application message comprising a trade execution report, an order entry acknowledgement, or a combination thereof.

In some embodiments, the first plurality of market feed data packets comprises an execution report (e.g., the order placed on MONTH-DAY-YEAR has executed), an acknowledgement (e.g., a limit order is placed for X security at Y shares per U.S. dollar), or a combination thereof.

In some embodiments, the using and translating collectively comprise commands for receiving a market feed data packet formatted in accordance with the DropCopy protocol. The commands include importing at least a first portion of the dynamically updated lookup table related to the Drop-Copy protocol. The commands also include importing at least a second portion of the dynamically updated lookup table related to the first client language. The imported data is parsed and output in the form of the first translated data construct.

In some embodiments, the third grammar is implemented in the first programming language. The first programming language is selected from the group consisting of C, C++, C#, Hypertext Preprocessor (PHP), Java, JavaScript, Perl, Python, and Ruby.

In some embodiments, the dynamically updated lookup table is updated in response to an update of the first exchange protocol (e.g., the MDP protocol patched and deployed from version 4.0.0 to version 4.0.1).

In some embodiments, the dynamically updated lookup table is updated in response to an update of the first exchange protocol without altering the first grammar of the first client language (e.g., commands of the first client request are not altered when the first exchange protocol is updated).

In some embodiments, the method further comprises updating the dynamically updated lookup table on a recurring basis to reflect changes in the second grammar over time (e.g., the table is updated with each first occurrence of a client interaction with the electronic exchange). In many embodiments, the recurring basis is a predetermined time interval (e.g., the table is updated is updated every Tuesday).

In some embodiments, responsive to a second client request from the first source, the method further comprises using the dynamically updated lookup table. The dynamically updated lookup table is used to translate the second client request into a second query. The second query includes one or more exchange elements in the plurality of exchange elements. The second client request is formatted in accordance with the first grammar of the first client language. The second query is formatted in accordance with the second grammar associated with the first exchange protocol. The method uses the second query to obtain a second plurality of market feed data packets responsive to the second client request. The second query is responsive to the contents of the first translated data construct. The method translates the second plurality of market feed data packets into a second programming language format in accordance with a fifth grammar. The second programming language is dictated by the second client request. The method uses the dynamically updated lookup table to translate data in the second plurality of market feed data packets from the second grammar to the fifth grammar. Through the translating, a second translated data construct is formed for the second plurality of market feed data packets. Additionally, the method communicates, to the first source, the second translated data construct.

In some embodiments, the second client request is an actionable event of the first translated data construct (e.g., the first translated data construct includes price data of a security and the second client request is a market order of the security at the price of the first translated data construct).

In some embodiments, the second client request is a portion of the first translated data construct (e.g., the first translated data construct includes price data for all companies in a sector and the second client request is a sell order for a single company in the sector.

In some embodiments, the method occurs over a time period of less than 350 milliseconds (ms). In some embodiments, the method occurs over a time period of less than 250 ms. In some embodiments, the method occurs over a time period of less than 150 ms.

In some embodiments, the first source is selected from the group consisting of a smartphone, a smartwatch, a personal digital assistant (PDA), an enterprise digital assistant, a tablet computer, and a desktop computer.

Another aspect of the present disclosure provides a computer implemented method. The computer implemented method comprises an electronic exchange operated on a first computer system and implemented in accordance with a first exchange protocol. The first exchange protocol includes a plurality of exchange elements. Responsive to a first client request, from a first source remote from the first computer system, a dynamically updated lookup table provided from a second source other than the first source is used. The dynamically updated lookup table includes a respective descriptor for each exchange element in at least a subset of the plurality of exchange elements of the first exchange protocol. The first client request is translated into a first query for one or more exchange elements in the plurality of exchange elements. The first client request is formatted in accordance with a first grammar of a first client language. Further, the first query is formatted in accordance with a second grammar associated with the first exchange protocol. The first query is used to obtain a first plurality of market feed data packets responsive to the first client request. The first plurality of market feed data packets is encoded in accordance with the first exchange protocol. The first plurality of market feed data packets is translated into plain text, as dictated by the first client request. The dynamically updated lookup table is used to translate data in the first plurality of market feed data packets from the second grammar to the plain text, thereby forming a first translated data construct for the first plurality of market feed data packets that includes information requested by the first client request. The computer implemented method further communicates, to the first source, the first translated data construct.

Another aspect of the present disclosure provides a computer system. The computer system comprises one or more processing units, a controller, a communications interface, a power supply, and a memory coupled to at least one of the one or more processing units. The memory stores a compiler. The compiler is executed by at least one of the one or more processing units. The compiler comprises instructions for an electronic exchange operated on a first computer system. The electronic exchange is implemented in accordance with a first exchange protocol. The first exchange protocol includes a plurality of exchange elements. Responsive to a first client request from a first source remote from the first computer system, instructions are further stored to use, (e.g., via the controller), a dynamically updated lookup table. The dynamically updated lookup table is provided from a second source other than the first source. The dynamically updated lookup table includes a respective descriptor for each exchange element in at least a subset of the plurality of exchange elements of the first exchange protocol. Instructions are further stored to translate the first client request into a first query for one or more exchange elements in the plurality of exchange elements. The first client request is formatted in accordance with a first grammar of a first client language. The first query is formatted in accordance with a second grammar associated with the first exchange protocol. Instructions are further stored to use the first query to obtain, (e.g., via the communications interface), a first plurality of market feed data packets responsive to the first client request. The first plurality of market feed data packets is encoded in accordance with the first exchange protocol. Instructions are further stored to translate, (e.g., via the controller), the first plurality of market feed data packets into a first programming language in accordance with a third grammar. The first programming language is dictated by the first client request. Instructions are further stored to use the dynamically updated lookup table to translate data in the first plurality of market feed data packets from the second grammar to the third grammar. The translating forms a first translated data construct for the first plurality of market feed data packets. The first translated data construct includes information requested by the first client request. Instructions are further stored to communicate, (e.g., via the communications interface), to the first source, the first translated data construct.

Furthermore, another aspect of the present disclosure provides a computer program product for use in conjunction with a computer system. The computer program product comprises a tangible computer readable storage medium and a computer program mechanism embedded therein. The computer program mechanism comprises a compiler. The compiler comprises instructions for an electronic exchange operated on a first computer system. The electronic exchange is implemented in accordance with a first exchange protocol. The first exchange protocol includes a plurality of exchange elements. Responsive to a first client request, from a first source remote from the first computer system, instructions are further stored to use a dynamically updated lookup table. The dynamically updated lookup table is provided from a second source other than the first source. The dynamically updated lookup table includes a respective descriptor for each exchange element in at least a subset of the plurality of exchange elements of the first exchange protocol. Instructions are further stored to translate the first client request into a first query for one or more exchange elements in the plurality of exchange elements. The first client request is formatted in accordance with a first grammar of a first client language. The first query is formatted in accordance with a second grammar associated with the first exchange protocol. Instructions are further stored to use the first query to obtain a first plurality of market feed data packets responsive to the first client request. The first plurality of market feed data packets is encoded in accordance with the first exchange protocol. Instructions are further stored to translate the first plurality of market feed data packets into a first programming language in accordance with a third grammar. The first programming language is dictated by the first client request. Instructions are further stored to use the dynamically updated lookup table to translate data in the first plurality of market feed data packets from the second grammar to the third grammar. The translating forms a first translated data construct for the first plurality of market feed data packets. The first translated data construct includes information requested by the first client request. Instructions are further stored to communicate, to the first source, the first translated data construct.

The systems and methods of the present invention have other features and advantages that will be apparent from, or are set forth in more detail in, the accompanying drawings, which are incorporated herein, and the following Detailed Description, which together serve to explain certain principles of exemplary embodiments of the present invention.

BRIEF DESCRIPTION OF THE DRAWINGS

FIGS. 6A, 6B, 6C, 6D, and 6E collectively illustrate a flow chart of methods for interpreting exchange data packets using a lookup table in accordance with an embodiment of the present disclosure, in which optional steps of embodiments are indicated by dashed boxes;

FIGS. 7A, 7B, 7C, and 7D collectively illustrate code for a book refresh including market data; and FIGS. 8A and 8B illustrate a variety of portions of a dynamically updated lookup table in accordance with an embodiment of the present disclosure.

Figure 1:
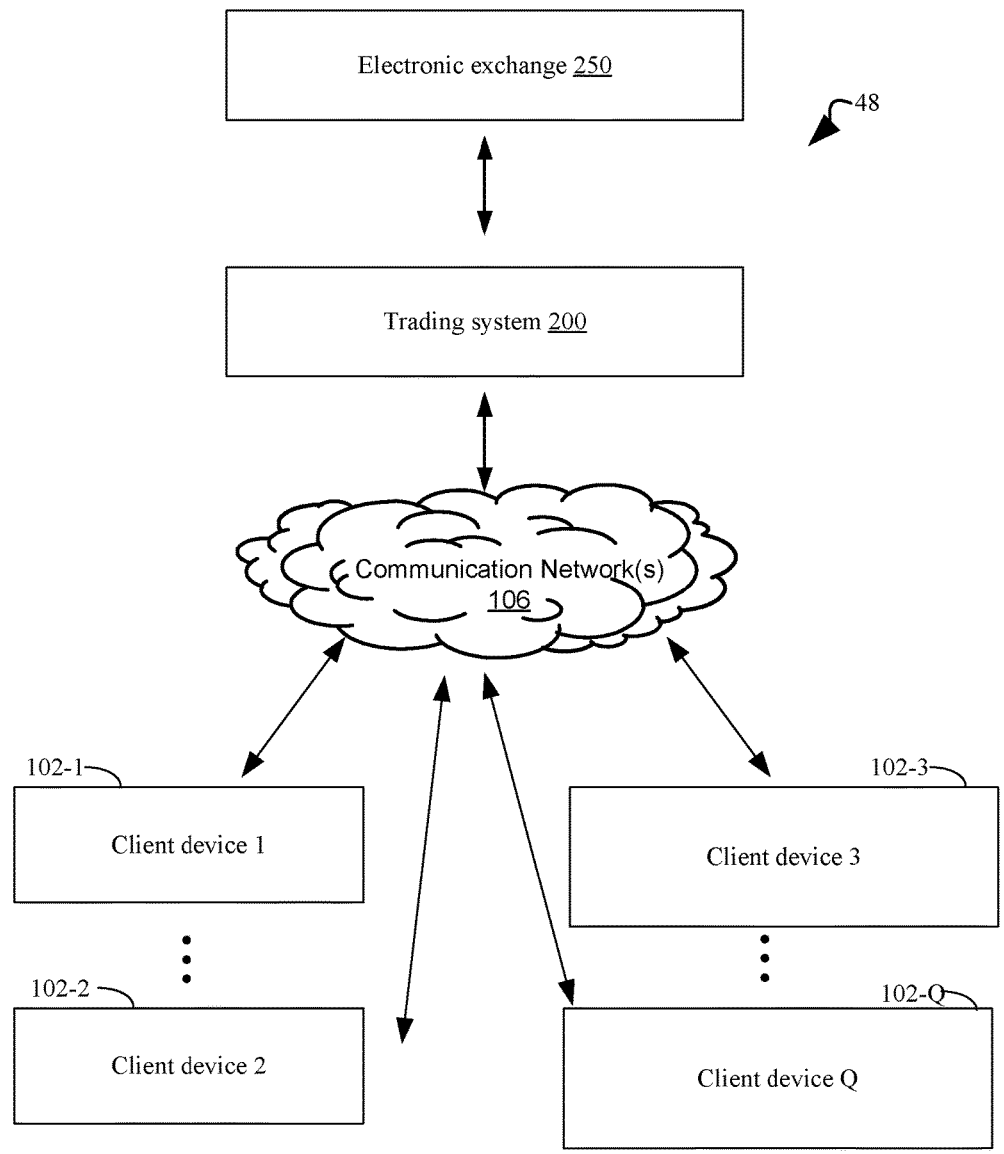
FIG. 1 illustrates an exemplary system topology that includes an electronic exchange for facilitating securities trading, a trading system for interpreting exchange data packets of the electronic exchange using a lookup table, and client devices associated with clients for facilitating market participation, where the above-identified components are interconnected, optionally through a communications network, in accordance with an embodiment of the present disclosure.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to implementations, examples of which are illustrated in the accompanying drawings. In the following detailed description of implementations, numerous specific details are set forth in order to provide a thorough understanding of the present invention. However, it will be apparent to one of ordinary skill in the art that the present invention may be practiced without these specific details.

It will also be understood that, although the terms first, second, etc. may be used herein to describe various elements, these elements should not be limited by these terms. These terms are only used to distinguish one element from another. For example, a first protocol could be termed a second protocol, and, similarly, a second protocol could be termed a first protocol, without departing from the scope of the present disclosure. The first protocol and the second protocol are both protocols, but they are not the same protocol.

The terminology used in the present disclosure is for the purpose of describing particular embodiments only and is not intended to be limiting of the invention. As used in the description of the invention and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

In some embodiments, systems and methods for interpreting exchange data in accordance with the present disclosure comprise an electronic exchange (e.g., the New York Stock Exchange) that is implemented according to a protocol. The protocol includes a plurality of exchange elements. Responsive to a client request from a first remote source, a dynamically updated lookup table is utilized. The dynamically updated lookup table includes descriptors for each exchange element in the plurality of exchange elements. The table is provided from a second remote source.

The request is formatted in accordance with a first grammar of a first client language. Once the request is received, it is translated into a query. The query is formatted in accordance with a second grammar associated with the protocol. They query is configured to retrieve at least a portion of the plurality of exchange elements associated with the request. A plurality of market feed data packets is obtained, which is encoded in accordance with the protocol of the electronic exchange. The market feed data packets are responsive to the request, which means that information communicated by the request is in the market feed data packets. Once obtained, the market feed data packets are translated into a programming language according to a third grammar. The exact programming language is dictated by the request. The market feed data packets are translated from the second grammar to the third grammar using the dynamically updated lookup table. This forms a translated construct for the market feed data packets. The translated data construct includes information communicated by the request. This translated data construct is communicated to the first source.

A detailed description of a system 48 for interpreting exchange data packets using a lookup table in accordance with the present disclosure is described in conjunction with FIGS. 1 through 4. As such, FIGS. 1 through 4 collectively illustrate the topology of the system in accordance with the present disclosure. In the topology, there is an electronic exchange 250 for facilitating securities trading between various clients, a trading system 200 for receiving and parsing market feed data packets using a dynamically updated lookup table, and client devices 102 associated with corresponding clients for facilitating market participation.

Throughout the present disclosure, the trading system 200 and the electronic exchange 250 will be referenced as separate devices solely for the purpose of clarity. That is, the disclosed functionality of the trading system 200 and the disclosed functionality of the electronic exchange 250 are contained in separate devices as illustrated in FIG. 1. However, it will be appreciated that, in fact, in some embodiments, the disclosed functionality of the trading system 200 and the disclosed functionality of the electronic exchange 250 are contained in a single device.

Referring to FIG. 1, the electronic exchange 250 facilitates securities trading between various clients. To accomplish this, a trading system 200, which is in electrical communication with the electronic exchange 250, receives market feed data packets originating from the electronic exchange. Each market feed data packet includes data regarding one or more market conditions. In some embodiments, these market conditions include, but are not limited to, price and/or trading volume, market participants and corresponding listing, securities such as bonds and stocks, or a combination thereof. In some embodiments, the trading system 200 receives the data directly from the electronic exchange 250. For instance, in some embodiments, the trading system 200 receives the data wirelessly through radio-frequency signals. In some embodiments, such signals are in accordance with 802.11 (Wi-Fi), Bluetooth, or ZigBee standard. In some embodiments, the trading system 200 receives the data directly, analyzes the data, and passes the analyzed data to the client devices 102.

In some embodiments, the trading system 200 is not proximate to the electronic exchange 250 and/or does not have wireless capabilities or such wireless capabilities are not used for the purpose of acquiring data packets. In such embodiments, a communication network 106 is used to communicate data from the trading system 200 to the electronic exchange 250 and/or the client devices 102.

Examples of networks 106 include, but are not limited to, the World Wide Web (WWW), an intranet and/or a wireless network, such as a cellular telephone network, a wireless local area network (LAN) and/or a metropolitan area network (MAN), and other devices by wireless communication. The wireless communication optionally uses any of a plurality of communications standards, protocols and technologies, including but not limited to Global System for Mobile Communications (GSM), Enhanced Data GSM Environment (EDGE), high-speed downlink packet access (HS-DPA), high-speed uplink packet access (HSDPA), Evolution, Data-Only (EV-DO), HSPA, HSPA+, Dual-Cell HSPA (DC-HSPDA), long term evolution (LTE), near field communication (NFC), wideband code division multiple access (W-CDMA), code division multiple access (CDMA), time division multiple access (TDMA), Bluetooth, Wireless Fidelity (Wi-Fi) (e.g., IEEE 802.11a, IEEE 802.11ac, IEEE 802.11ax, IEEE 802.11b, IEEE 802.11g and/or IEEE 802.11n), voice over Internet Protocol (VoW), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of the present disclosure.

Of course, other topologies of the system 48 other than the one depicted in FIG. 1 are possible. For instance, rather than relying on a communications network 106, the one or more client devices 102 may wirelessly transmit information directly to the trading system 200 and/or the electronic exchange 250. Further, the electronic exchange 250 and the trading system 200 may constitute a server computer, or in fact constitute several computers that are linked together in a network or be a virtual machine or a container in a cloud computing context. As such, the exemplary topology shown in FIG. 1 merely serves to describe the features of an embodiment of the present disclosure in a manner that will be readily understood to one of skill in the art.

Figure 2:
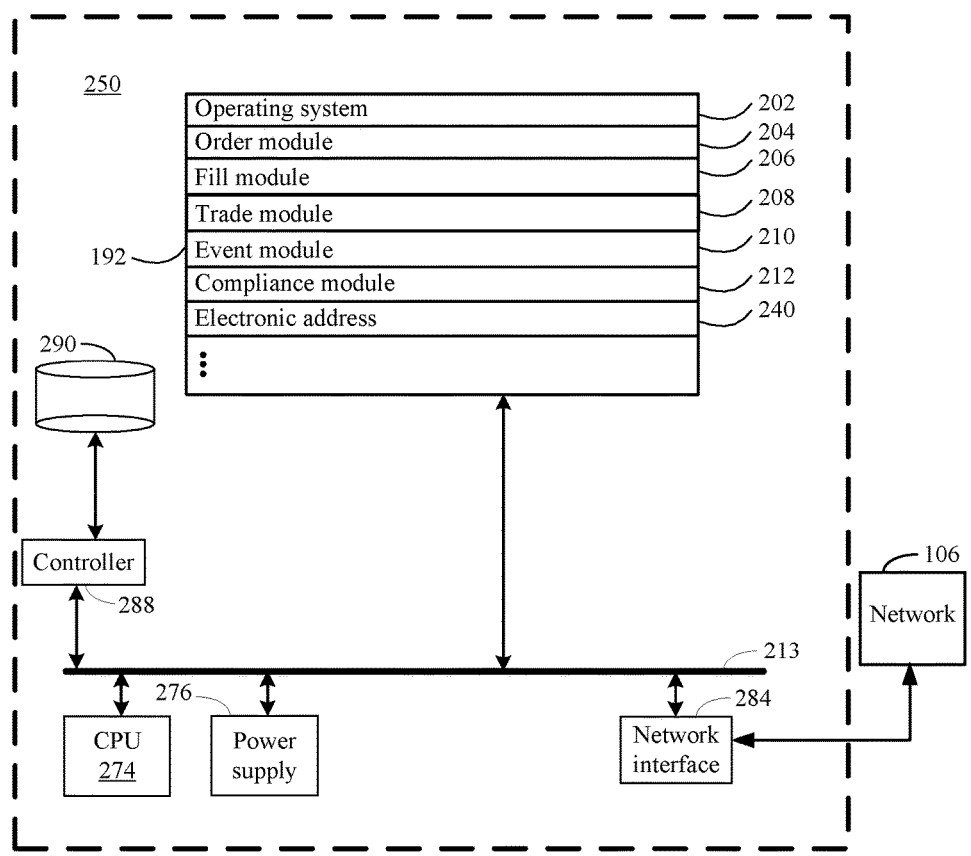
FIG. 2 illustrates an electronic exchange for facilitating securities trading in accordance with an embodiment of the present disclosure.

Referring to FIG. 2, in some embodiments, the electronic exchange 250 comprises one or more computers. For purpose of illustration in FIG. 2, the electronic exchange 250 is represented as a single computer that includes all the functionality for facilitating securities trading. However, the present disclosure is not so limited. In some embodiments, the functionality for facilitating securities trading is spread across any number of networked computers and/or resides on each of several networked computers and/or is hosted on one or more virtual machines and/or containers at a remote location accessible across the communications network 106. One of skill in the art will appreciate that any of a wide array of different computer topologies are used for the application and all such topologies are within the scope of the present disclosure.

Turning to FIG. 2 with the foregoing in mind, an exemplary electronic exchange 250 for facilitating securities trading comprises one or more processing units (CPU's) 274, a network or other communications interface 284, a memory 192 (e.g., random access memory), one or more magnetic disk storage and/or persistent devices 290 optionally accessed by one or more controllers 288, one or more communication busses 213 for interconnecting the aforementioned components, and a power supply 276 for powering the aforementioned components. In some embodiments, data in memory 192 is seamlessly shared with non-volatile memory 290 using known computing techniques such as caching. In some embodiments, memory 192 and/or memory 290 may in fact be hosted on computers that are external to the electronic exchange 250 but that can be electronically accessed by the electronic exchange 250 over an Internet, intranet, or other form of network or electronic cable (illustrated as element 106 in FIG. 2) using network interface 284.

In some embodiments, the memory 192 of the electronic exchange for facilitating securities trading stores:

an operating system 202 that includes procedures for handling various basic system services;

an order module 204 that includes procedures for handling or storing a variety of incoming and outgoing securities orders;

a fill module 206 that includes procedures for conducting or satisfying a variety of securities orders;

a trade module 208 that includes procedures for the methods of the present disclosure including a dynamically updated lookup table;

an event module 210 that includes procedures for event management including, but not limited to, taxable events, liquidity events, triggering events, and termination events;

a compliance module 212 for verifying, receiving, and analyzing regulations and compliance measures of an electronic exchange (e.g., the U.S. Securities and Exchange Commission (SEC) compliance regulations); and an electronic address 240 associated with the corresponding electronic exchange that is used by the trading system 200 to identify electronic exchanges and data communicated with the electronic exchange.

In some implementations, one or more of the above identified data elements or modules of the electronic exchange 250 for facilitating securities trading are stored in one or more of the previously described memory devices, and correspond to a set of instructions for performing a function as described above. The above-identified data, modules, or programs (e.g., sets of instructions) need not be implemented as separate software programs, procedures, or modules, and thus various subsets of these modules may be combined or otherwise re-arranged in various implementations. In some implementations, the memory 192 and/or 290 optionally stores a subset of modules and data structures identified above. Furthermore, in some embodiments the memory 192 and/or 290 stores additional modules and data structures not described above.

As previously described, in some embodiments the trading system 200 is subsumed by the electronic exchange 250. In such embodiments, the trading system 200 is the trade module 208. In some embodiments, the trading system 200 accesses the electronic exchange 250 from the trade module 208.

Figure 3:
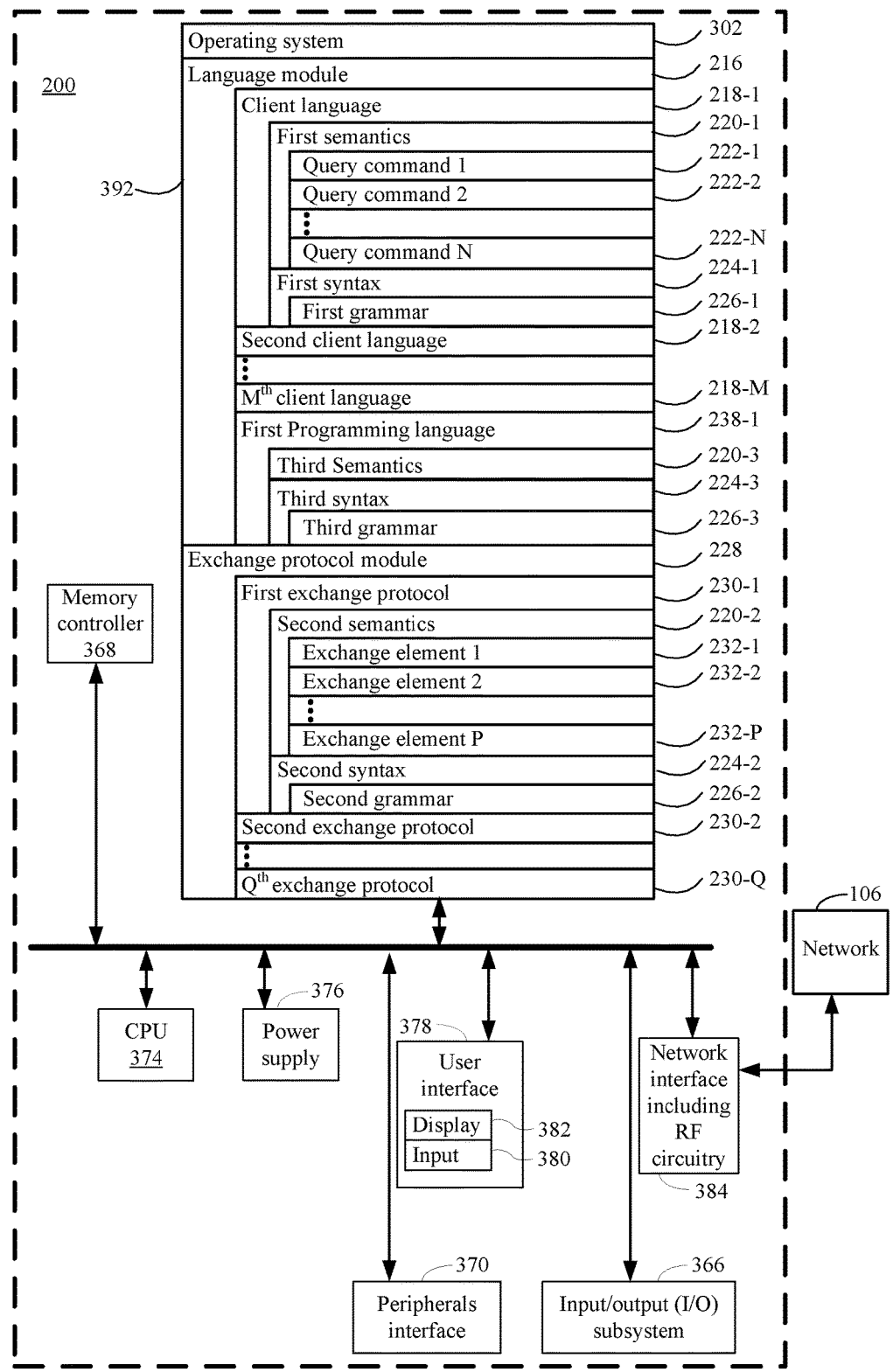
FIG. 3 illustrates a trading system for interpreting data packets of an electronic exchange using a lookup table in accordance with an embodiment of the present disclosure.

FIG. 3 provides a description of a trading system 200 that can be used with the instant disclosure. The trading system 200 illustrated in FIG. 3 has one or more processing units (CPU's) 374, peripherals interface 370, memory controller 368, a network or other communications interface 384, a memory 392 (e.g., random access memory), a user interface 378, the user interface 378 including a display 382 and input 380 (e.g., keyboard, keypad, touch screen), an optional input/output (I/O) subsystem 366, one or more communication busses 313 for interconnecting the aforementioned components, and a power supply 376 for powering the aforementioned components.

In some embodiments, the input 380 is a touch-sensitive display, such as a touch-sensitive surface. In some embodiments, the user interface 378 includes one or more soft keyboard embodiments. The soft keyboard embodiments include standard (QWERTY) and/or non-standard configurations of symbols on the displayed icons.

It should be appreciated that the trading system 200 illustrated in FIG. 3 is only one example of a device that may be used for receiving data packets from the electronic exchange 250, and that the trading system 200 optionally has more or fewer components than shown, optionally combines two or more components, or optionally has a different configuration or arrangement of the components. The various components shown in FIG. 3 are implemented in hardware, software, firmware, or a combination thereof, including one or more signal processing and/or application specific integrated circuits.

Memory 392 of the trading system 200 illustrated in FIG. 3 optionally includes high-speed random access memory and optionally also includes non-volatile memory, such as one or more magnetic disk storage devices, flash memory devices, or other non-volatile solid-state memory devices. Access to memory 392 by other components of the trading system 200, such as CPU(s) 374 is, optionally, controlled by the memory controller 368.

In some embodiments, the memory 392 of the trading system 200 stores:

an operating system 302 that includes procedures for handling various basic system services;

a language module 216 that comprises a variety of languages including client languages 218 and programming languages 228, where each language has a corresponding semantic 220, including query commands 222, and syntax 224; and an exchange protocol module 228 that comprises the exchange protocols 230, each including a corresponding semantic 220 and syntax 224.

As previously described, in some embodiments, the memory 392 of the trading system 200 illustrated in FIG. 3 is included as an instance of the trade module 208 of the electronic exchange 250 described in conjunction with FIG. 2 above. In some such embodiments, the functionality of the instanced trade module 208 installed on the electronic exchange 250 is limited to those that pertain to a corresponding single electronic exchange (e.g., single stock exchange) associated with the trading system 200.

In some embodiments, the language module 216 and the exchange protocol module 228 of the memory 392 of the trading system 200 are collectively stored in a lookup table. Thus, each module is a component of the lookup table. In typical embodiments, the lookup table is dynamically updated. As used herein, the term "dynamically" means an ability to update a program while the program is currently running. For instance, when a new syntax 224 of a programming language 238 is released, the lookup table automatically updates the relative portions therein to reflect the recent release changes of the programming language 238 without requiring a forced update. Likewise, when an exchange protocol (e.g., exchange protocol 230 of FIG. 3) is updated or released, the lookup table automatically registers and implements the update without human intervention. Dynamic updates of the lookup table will be described infra.

In some embodiments, the memory 392 of the trading system 200 illustrated in FIG. 3 includes a language module 216 that specifies one or more client languages (e.g., client language 218 of FIG. 3) and one or more programming languages (e.g., programming language 238 of FIG. 3).

In general, a language comprises a variety of semantics (e.g., semantics 220 of FIG. 3) and a syntax (e.g., syntaxes 224 of FIG. 3). The semantics 220 determine how a programming language is constructed, such as possible query commands (e.g., commands 222 of FIG. 3) to be used in the programming language 238. The syntax 224 determines the structure and the grammar 226 of the programming language 238. Various aspects of the present disclosure are related to an ability to automatically update the semantics 220, the syntax 224, and grammar 226 of languages (e.g., client language 218 and/or programming language 238) without human intervention. While FIG. 3 only depicts a first programming language (e.g., first programming language 238-1), the present disclosure is not limited thereto. For example, in some embodiments there exists any number of programming languages (e.g., programming language 238-$n$ where n is an integer greater than or equal to one) within the language module 216.

In some embodiments, the memory 392 of the trading system 200 illustrated in FIG. 3 includes an exchange protocol module 228 that specifies one or more exchange protocols (e.g., exchange protocol 230 of FIG. 3). In general, each electronic exchange 250 dictates at least one exchange protocol 230 to be utilized by the exchange 250. Typical exchange protocols 230 include, but are not limited to, financial information exchange (FIX), FIX adapted for Streaming (FAST), market data platform (MDP), DropCopy, and iLink. For instance, the Chicago Mercantile Exchange (CME) utilizes market data platform protocol to transmit market events, iLink protocol to access the electronic exchange 250 to enter, modify, and cancel orders, and DropCopy protocol to execute orders. These exchange protocols 230 and their interaction with the trading system 200 will be described in more detail infra.

In many embodiments of the present disclosure, the client language (e.g., client language 218) is a language a client inputs a request with (e.g., a language of an API call), the programming language (e.g., programming language 238) is an output language of the request as defined by the client (e.g., output the request in C++, in JAVA, and/or in Python), and the exchange protocol (e.g., exchange protocol 230) language is a language of the electronic exchange 250. However, the present disclosure is not limited thereto.

The peripherals interface 370 can be used to couple input and output peripherals of the system to CPU(s) 374 and memory 392. The one or more processors 374 run or execute various software programs and/or sets of instructions stored in memory 392 to perform various functions for the trading system 200 and to process data.

In some embodiments, the peripherals interface 370, CPU(s) 374, and memory controller 368 are, optionally, implemented on a single chip. In some other embodiments, they are implemented on separate chips.

RF (radio frequency) circuitry of network interface 384 receives and sends RF signals, also called electromagnetic signals. In some embodiments, the market feed data packets are received using this RF circuitry from the electronic exchange 250. In some embodiments, the RF circuitry 384 converts electrical signals to/from electromagnetic signals and communicates with communications networks and other communications devices, client devices 102 and/or the electronic exchange 250 via the electromagnetic signals. The RF circuitry 384 optionally includes well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 384 optionally communicates with the communication network 106. In some embodiments, the circuitry 284 does not include RF circuitry and, in fact, is connected to the network 106 through one or more hard wires (e.g., an optical cable, a coaxial cable, or the like).

In some embodiments, the power supply 376 optionally includes a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

As illustrated in FIG. 3, a trading system 200 preferably comprises an operating system 302 that includes procedures for handling various basic system services. The operating system 302 (e.g., iOS, DARWIN, RTXC, LINUX, UNIX, OS X, WINDOWS, or an embedded operating system such as VxWorks) includes various software components and/or drivers for controlling and managing general system tasks (e.g., memory management, storage device control, power management, etc.) and facilitates communication between various hardware and software components.

In the interest of brevity and clarity, only a few of the possible components of the trading system 200 are shown in order to better emphasize the additional software modules that are installed on the trading system 200.

Figure 4:
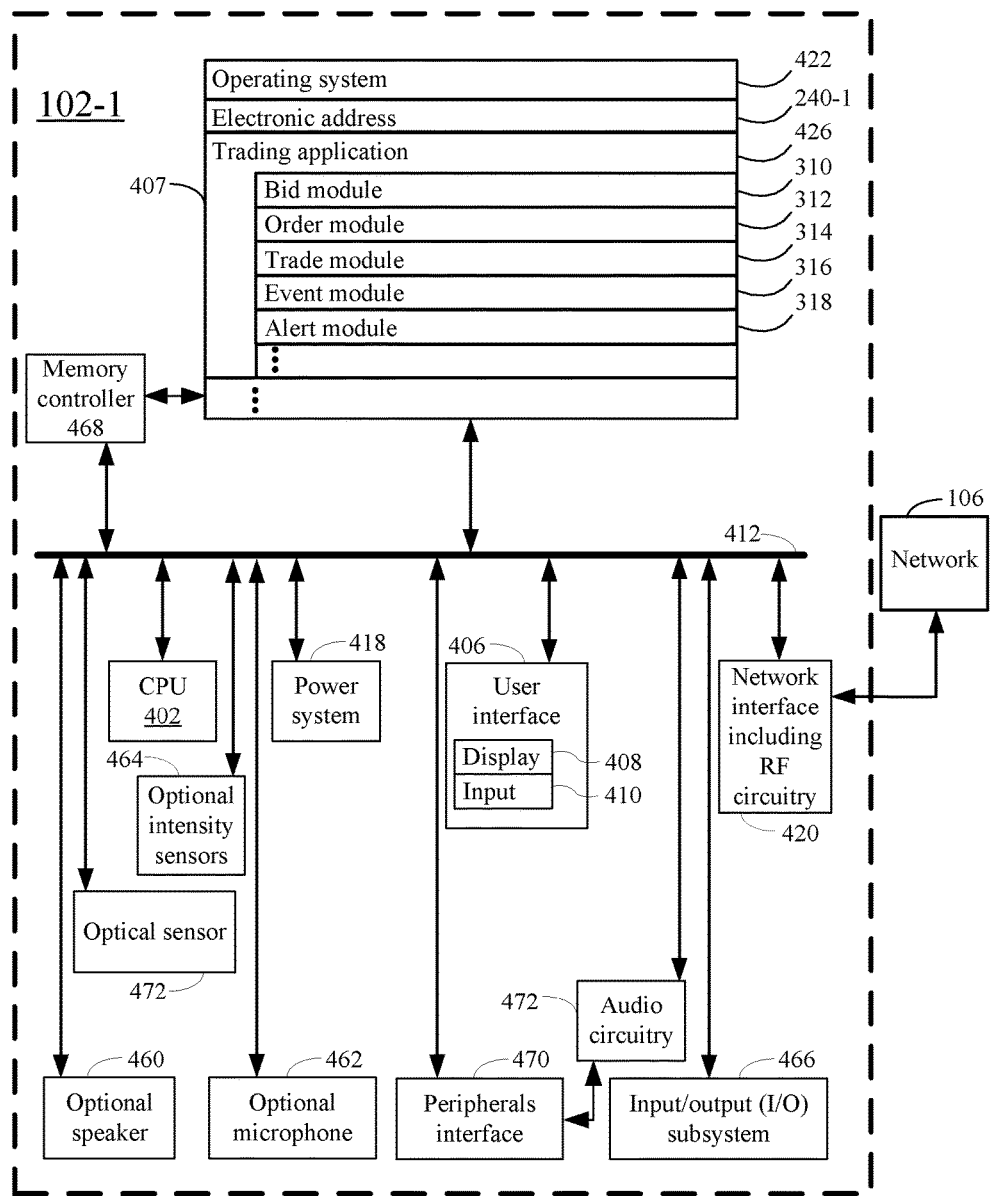
FIG. 4 illustrates a client device associated with a respective client for facilitating market participation in accordance with an exemplary embodiment of the present disclosure.

FIG. 4 provides a description of a client device 102 that can be used with the instant disclosure. In the interest of brevity and clarity, only a few of the possible components of the client device 102 are shown in order to better emphasize the additional software modules that are installed on the client device 102. In some embodiments, memory 407 of the client device 102 for facilitating market participation stores:

- an operating system 422 that includes procedures for handling various basic system services;
- an electronic address 240 associated with the corresponding electronic exchange that is used by the trading system 200 to identify electronic exchanges and data communicated with the electronic exchange; and
- a trading application 426 to facilitate securities trading, the trading application including a bid module 310 to bid on securities, an order module 312 to process pending orders, a trade module 314 to process communication with the trading system 200, an event module to process market events, and an alert module to alert a client regarding a variety of market information.

In some embodiments the client device 102 is a smart phone. In other embodiments, the client device 102 is not a smart phone but rather is a tablet computer, desktop computer, smartwatch, or other form or wired or wireless networked device.

Figure 5:
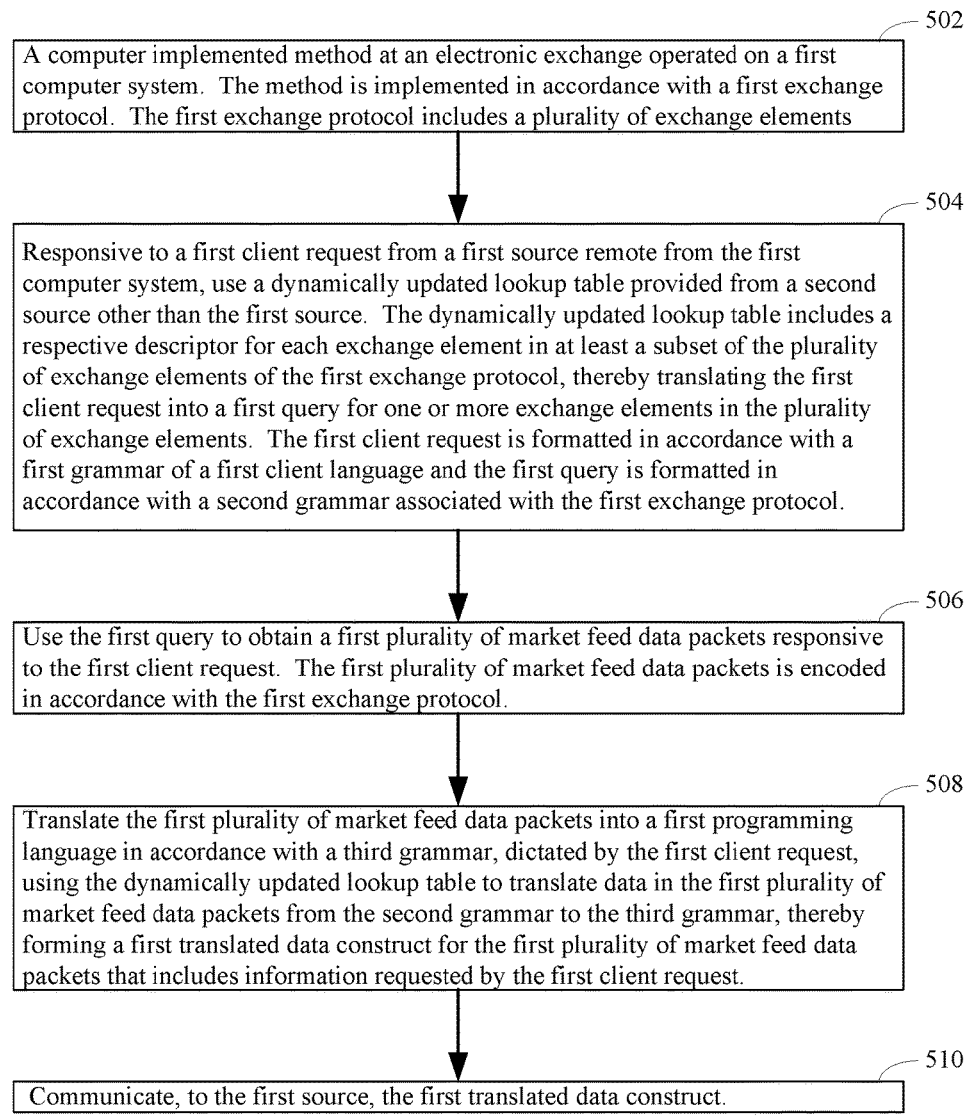
FIG. 5 provides a flow chart of a method for interpreting exchange data packets using a lookup table in accordance with an embodiment of the present disclosure.

Now that a system 48 has been described for interpreting exchange data packets using a lookup table in accordance with various embodiments of the present disclosure, details regarding some processes in accordance with FIG. 5 and FIG. 6 will be disclosed. FIG. 5 illustrates a flow chart of methods for interpreting exchange data packets using a lookup table in accordance with embodiments of the present disclosure. FIG. 6 collectively illustrates a detailed flow chart of methods for interpreting exchange data packets using a lookup table in accordance with an exemplary embodiment of the present disclosure. In the flow charts, the preferred parts of the methods are shown in solid line boxes whereas optional variants of the methods, or optional equipment used by the methods, are shown in dashed line boxes. As such, FIGS. 5 and 6 illustrate methods for interpreting exchange data packets using a lookup table.

Certain steps are performed by various modules in memory 392. It will be appreciated that the steps described in FIGS. 5 and 6 can be encoded in a single module or any combination of modules.

Block 502.

With reference to block 502 of FIG. 5, the goal of embodiments of the present disclosure is to interpret exchange data packets of an electronic exchange 250 using a lookup table. At an electronic exchange (e.g., electronic exchange 250 of FIGS. 1 and 2) operated on a first computer system, the method is implemented in accordance with a first exchange protocol (e.g., first exchange protocol 230-1 of FIG. 3). The first exchange protocol includes a variety of exchange elements (e.g., exchange elements 232 of FIG. 3). The exchange elements will be described in for detail infra.

Block 504.

Referring to FIG. 5, the method comprises, responsive to a first client request from a first source (e.g., client device 102 of FIG. 1) remote from the first computer system, using a dynamically updated lookup table provided from a second source (e.g., trading system 200) other than the first source. The dynamically updated lookup table includes a respective descriptor for each exchange element (e.g., exchange element 232 of FIG. 3). Each exchange element is in at least a subset of exchange elements. The first client request is translated into a first query for one or more exchange elements (e.g., a query for price data of securities on the NYSE). The first client request is formatted in accordance with a first grammar (e.g., first grammar 226-1 of FIG. 3) of a first client language (e.g., first client language 218-1 of FIG. 2). The first query is formatted in accordance with a second grammar (e.g., second grammar 226-2 of FIG. 2) associated with the first exchange protocol (e.g., first exchange protocol 230-1 of FIG. 3). For instance, in some embodiments the client requests a history of recent trades on the CME (e.g., electronic exchange 250) in a representational state transfer API call (e.g., first client language and grammar). The CME dictates MDP protocol (e.g., exchange protocol 230), thus the query is formatted in accordance with the semantics 220 and the syntax 224 of the MDP.

Block 506.

Referring to FIG. 5, the method comprises using the first query to obtain a first plurality of market feed data packets. The market feed data packets are responsive to the first client request. The market feed data packets are encoded in accordance with the first exchange protocol. For instance, when the first exchange protocol 230-1 is iLink, the market feed data packets and corresponding exchange elements 232 are encoded according to the semantics 220 and syntax 224 of iLink.

Block 508.

Referring to FIG. 5, the method comprises translating the market feed data packets into a first programming language (e.g., first programming language 238-1 of FIG. 3) in accordance with a third grammar (e.g., third grammar 226-3 of FIG. 3). The programming language 238 is dictated by the first client request (e.g., the client requests an output in JAVA or Ruby). The dynamically updated lookup table is utilized to translate data in the market feed data packets from the second grammar (e.g., second grammar 226-2 of first exchange protocol 240-1) to the third grammar (e.g., third grammar 226-3 of first programming language 238-1). A first translated data construct is formed for the market feed data packets. The translated data construct, which is the output of the request, includes the information requested by the first client request. For example, when the client requests, in a REST API call (e.g., first client language 218-1), price data of a stock on the CME (e.g., first exchange protocol 230-1) in Python (e.g., first programming language 238-1), the translated data construct is the price data of the stock in Python.

Block 510.

Referring to FIG. 5, the method communicates, to the first source, the first translated data construct. Thus, throughout the methods of the present disclosure, data within a market feed data packet is transformed from standard protocol data to extracted data in accordance with the protocol. The extracted data is then applied to conversion code in order to translate extracted data. The translated extracted data is then applied to code utilized to call the packet post conversion. Results of the called extracted code packet are then supplied in a programming language.

A more detailed description of the previously described methods of FIG. 5 will now be described with reference to FIGS. 6A through 6E.

Block 602.

Figure 6A:
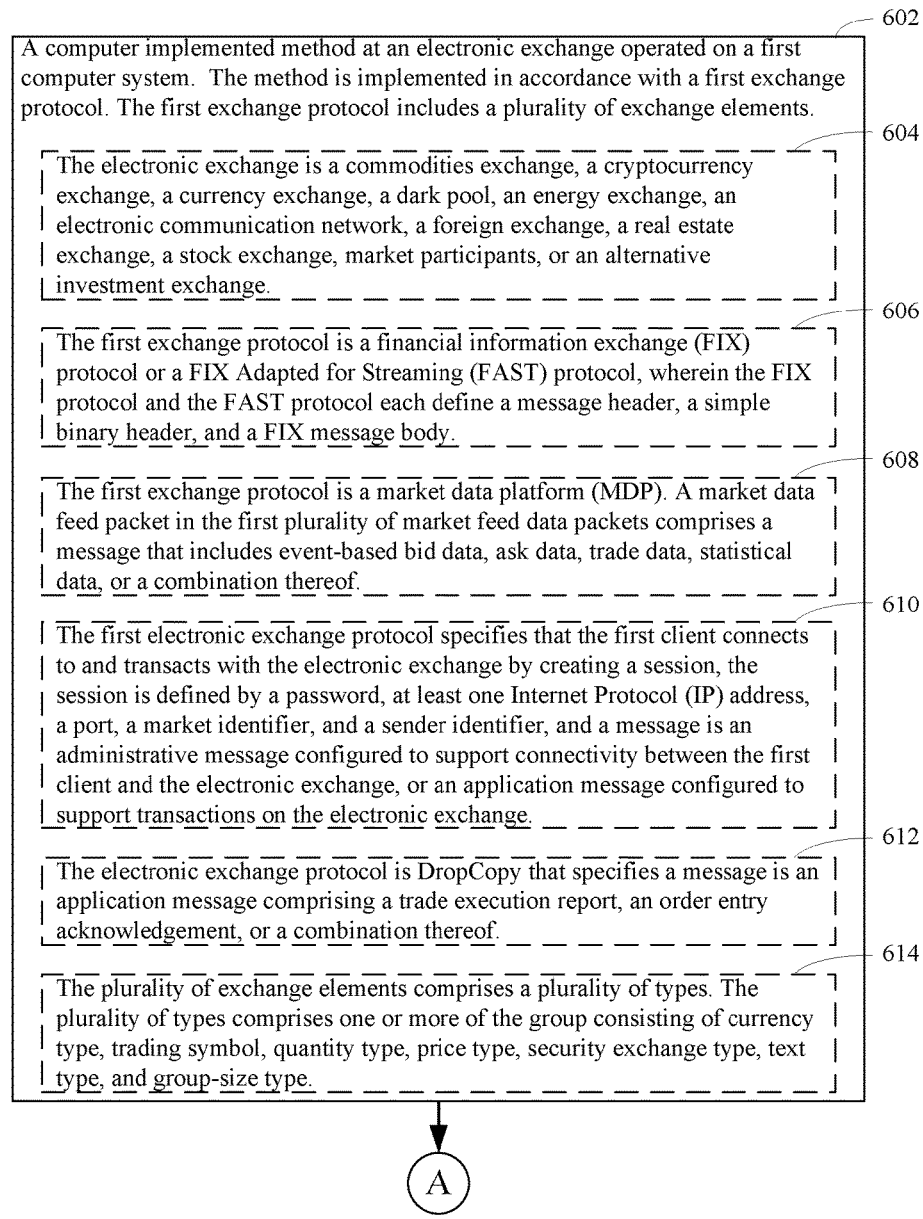

Referring to block 602 of FIG. 6A, a computer implemented method at an electronic exchange 250, which operated on a first computer system, is implemented in accordance with a first exchange protocol 230. Exchange protocols 230 include, but are not limited to, FIX, FAST, MDP, DropCopy, and iLink. The exchange protocol 230 includes a variety of exchange elements 232.

Block 604.

Referring to block 604 of FIG. 6A, in some embodiments the electronic exchange 250 is a commodities exchange, a cryptocurrency exchange, a currency exchange, a dark pool, an energy exchange, an electronic communication network, a foreign exchange, a real estate exchange, a stock exchange, market participants, or an alternative investment exchange. However, the present disclosure is not limited thereto. For instance, in some embodiments the present disclosure is applied to any type of electronic exchange that is available at the time of the present disclosure, or any electronic exchanges that are opened at a future time. Examples of such exchanges include, but are not limited to, the Chicago Board of Trade (CBOT), the Chicago Mercantile Exchange (CME), the Commodity Exchange, Inc (COMEX), a Digital Currency Exchange (DCE) such as Coinbase or GDAX, the Kansas City Board of Trade (KCBT), the London Commodity Exchange (LCE), the London Metal Exchange (LME), the Minneapolis Grain Exchange (MGEX), the Nautilus Mediterranean Exchange (NAMEX), the New York Board of Trade (NYBOT), the New York Mercantile Exchange (NYMEX), the New York Stock Exchange (NYSE), the Tokyo Commodity Exchange (TOCOM), and the like.

Block 606.

Referring to FIG. 6A, in some embodiments the first exchange protocol (e.g., first exchange protocol 230-1 of FIG. 3) is a financial information exchange (FIX) protocol or a FIX Adapted for Streaming (FAST) protocol. Typically, the FIX protocol and the FAST protocol each define a message header, a simple binary header, and a FIX message body. In some embodiments, the message includes a trailer. Typically, the body of the message includes order and/or trade detail information. The trailer of the message includes security verification information through standard signature and CheckSum procedures.

Block 608.

Referring to block 608 of FIG. 6A, in some embodiments the first exchange protocol 230 is a market data platform (MDP) protocol. In such an embodiment, a market feed data packet comprises a message. The message is utilized to communicate market events (e.g., stock buy event, order termination event). The message includes, but is not limited to, event-based bid data, ask data, trade data, statistical data, or a combination thereof. Additionally, in some embodiments the message includes market statistics (e.g., fifty or two-hundred day moving values). For instance, in some embodiments an MDP message communicates an instantaneous full refresh of an electronic exchange 250.

Block 610.

Referring to block 610 of FIG. 6A, in some embodiments the electronic exchange protocol 230 specifies that the client connects to and transacts with the electronic exchange 250 by creating a session. In some embodiments, the session is defined by a password, at least one Internet Protocol (IP) address, a port, a market identifier (e.g., an identifier of the electronic exchange 250), and a sender identifier (e.g., an identifier of a client and/or client device 102). In such a protocol, a message is an administrative message. Administrative messages are configured to support connectivity between the client device 102 and the electronic exchange 250. In some instances, the message is an application message. Application messages are configured to support transactions on the electronic exchange 250. In such embodiments, the exchange protocol 230 is typically the iLink protocol.

Block 612.

Referring to block 612 of FIG. 6A, in some embodiments the electronic exchange protocol 230 is DropCopy. DropCopy specifies an application message comprising a trade execution report, an order entry acknowledgement, or a combination thereof. Typically, the DropCopy protocol enables clients to receive real-time execution and acknowledgment messages as they are relayed on iLink protocol sessions. Thus, DropCopy aggregates iLink messages. For instance, when a message of a session on the iLink protocol states a market buy order of a security X, the DropCopy protocol copies the market buy order of the security X from the message of the iLink session and executes the order.

In the interest of brevity and clarity, only a few of the possible features of the MDP, iLink, and DropCopy protocols have been described. More information and features are found at the CME Group Client Systems Wiki on the Internet at cmegroup.com/confluence/display/EPICSAND-BOX/Enterprise+Platform+Information+Console, accessed February 2018.

Block 614.

Referring to block 614 of FIG. 6A, in some embodiments the exchange elements (e.g., exchange elements 232 of FIG. 3) comprises a variety of types. Examples of types include, but are not limited to, a currency type (e.g., Australian Dollars (AUD), Bitcoin (BTC), Ethereum (ETH), Euros (EUR), U.S. Dollars (USD), Yuan (CNY) and the like), trading symbol (e.g., Lockheed Martin is identified as LMT; J.M. Smucker is identified as SJM), quantity type (e.g., two (2) stocks; five (5) kilograms of commodity), price type (e.g., USD per stock; pounds of commodity per ETH), security exchange type (e.g., the exchange to be traded on such as the CME or the NYSE), text type, and group-size type for defining a number of entries in a corresponding message.

In some embodiments, types are either primitive, simple, composite, enumerated, or sets of bits. Types can have sub-types. The exact sub-type is dictated by a kind of information to be communicated. The previously described types are only a few types in a plurality of types available and are not meant to limit the present disclosure thereto. For instance, in some embodiments there exists asset types, attribute types, and instrument types. Types exist to assist defining what is being trading, such as an exchange-traded fund (ETF), a stock, a bond, a commodity, a cryptocurrency and the like.

Block 616.

Referring to block 616 of FIG. 6B, responsive to a first client request, from a first source remote (e.g., client device 102 of FIGS. 1 and 4) from the first computer system, the method uses a dynamically updated lookup table (e.g., language module 216 and exchange protocol module 228) provided from a second source (e.g., electronic exchange 250 of FIG. 2 or trading system 200 of FIG. 3) other than the first source. The dynamically updated lookup table includes a respective descriptor for each exchange element 232. The method translates the client request into a first query for one or more exchange elements 232. For instance, a request for pending orders of a security becomes a query for corresponding exchange elements 232 which describe the pending orders. The first client request is formatted in accordance with a first grammar of a first client language, such as a grammar of an API call. The first query is formatted in accordance with a second grammar 226 associated with the first exchange protocol 230. Thus, the present disclosure readily translates the client language 218 of the request into the language (e.g., semantics 220 and syntax 224) of the exchange protocol 230.

Block 618.

Referring to block 618 of FIG. 6B, in some embodiments the first client request is in the form of an application programming interface call (API).

Block 620.

Referring to block 620 of FIG. 6B, in some embodiments the first client request comprises a request to enter an order, a request to modify an order, a request to cancel an order, or a combination thereof. In some embodiments, the client request is an order or a trade. However, the present disclosure is not limited thereto. In general, client requests have a wide array of possible commands that are associated with trading securities on electronic exchanges.

Blocks 622 and 624.

Referring to blocks 622 and 624 of FIG. 6B, in some embodiments the dynamically updated lookup table is updated on a recurring basis to reflect changes in the second grammar 226 over time. For instance, when an exchange protocol 230 is updated or a new patch of the exchange protocol is released, the dynamically updated lookup table adjusts and implements the changes of the exchange protocol without human intervention. For example, when a new template (e.g., new semantics 220 and/or new grammar 224) of the MDP protocol is released, the new template is automatically incorporated in the dynamically updated lookup table. The frequency and triggering events at which the dynamically updated lookup table is updated depends on a design of the present disclosure. In some embodiments, the reoccurring basis is an actionable event of a client. For instance, in some embodiments the table updates each time a client request is received. In some embodiments, the table updates each time an error message is returned from a client request. In some embodiments, the reoccurring basis is a predetermined time interval, such as automatically updating at 3 P.M. PST each day or automatically updating on the first of each month.

Block 626.

Referring to block 626 of FIG. 6B, in some embodiments using the dynamically updated lookup table includes providing a plain text version of the message in the form of the first translated data construct. In such embodiments, a client might prefer to have market data received in legible, easily reproduced form. For such embodiments, the first programming language 238 is plain text. Thus, the semantics 220 and syntax 224 is the same as a standard language such as English or Chinese.

Blocks 628 and 630.

Referring to blocks 628 and 630 of FIG. 6B, in some embodiments using the dynamically updated lookup table includes providing a decompiled version of the message in the form of the first translated data construct. For instance, a client requests price data of various security from a selection of securities on an electronic exchange 250. The message, or messages, of the query of the request will comprises the corresponding price data of each selected security. The price data is in a compact form, such shortcut combined data and abbreviations, which is decompiled and expanded. In some embodiments, using the dynamically updated lookup table comprises providing a summarized version of the message in the form of the first translated data construct. The contents of the summarized version depend on the corresponding client request and a design of the present disclosure. For instance, when a client requests prices of shares of companies in a specific sector, the translated construct communicates a summarized top of book for each company.

Blocks 632 and 634.

Referring to blocks 632 and 634 of FIG. 6B, in some embodiments the dynamically updated lookup table is updated in response to an update of the first exchange protocol 230. For instance, when a new patch of FIX is implemented publically the corresponding exchange protocol 230 of the exchange protocol module 228 of the lookup table is updated. In some embodiments, the dynamically updated lookup table is updated in response to an update of the first exchange protocol 230 without altering the first grammar 226 of the first client language 218. Thus, a client does not need to change a format or language of their requests when the exchange protocol is updated. For instance, when an exchange protocol 230 updates how trading symbols (e.g., exchange elements 232) are communicated (e.g., from a four-digit identifier to a three-digit identifier), the client does not need to change their commands. This substantially simplifies how clients are able to retrieve data of the electronic exchange 250.

Block 636.

Referring to block 636 of FIG. 6B, in some embodiments the first source (e.g., client device 102 of FIGS. 1 and 4) is a smartphone, a smartwatch, a personal digital assistant (PDA), an enterprise digital assistant, a tablet computer, or a desktop computer. However, the present disclosure is not limited thereto. For example, any suitable internet enabled computer device will suffice as a client device 102 as long as a client has an ability to interact with the trading system 200 therefrom and install software application(s) therein.

Block 638.

Figure 6C:
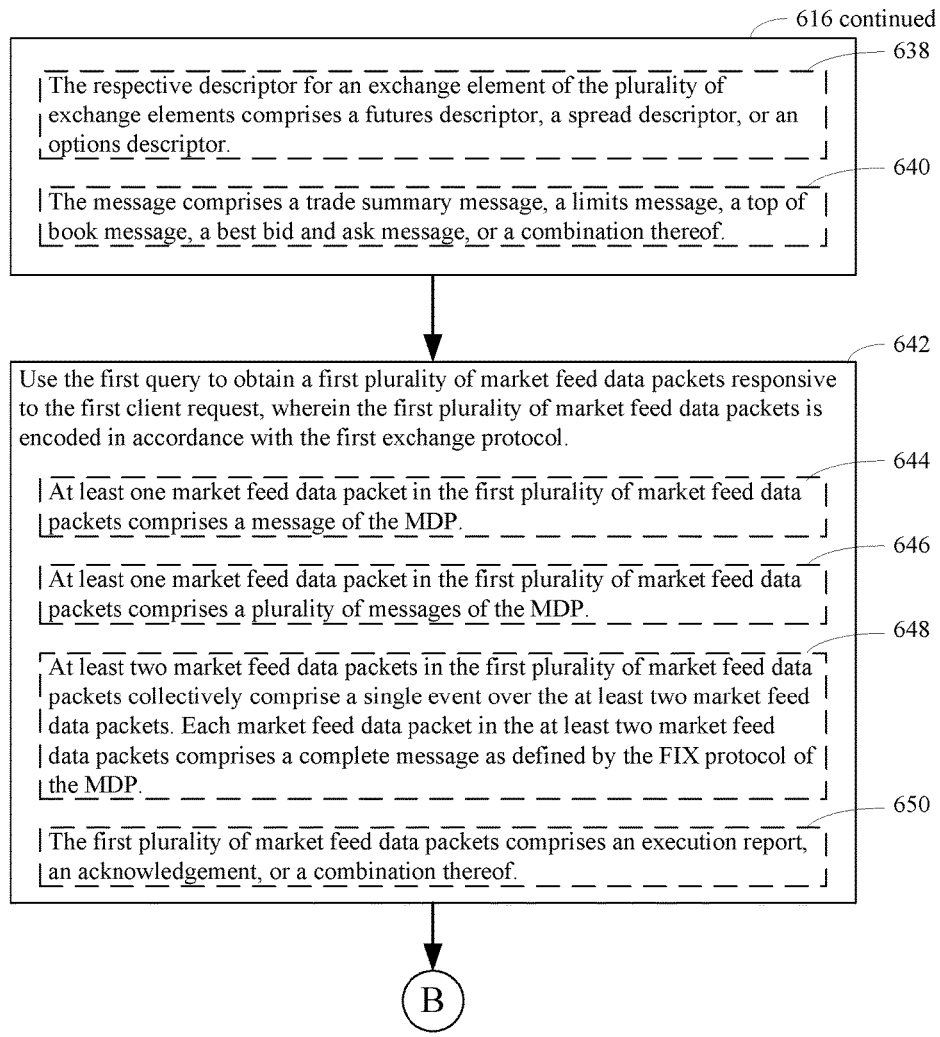

Referring to block 638 of FIG. 6C, in some embodiments the respective descriptor for an exchange element 232 comprises a futures descriptor, a spread descriptor, or an options descriptor. The descriptor for a corresponding exchange element 232 defines the type of trading an exchange element 232 is associated with. For instance, when an exchange element 232 is classified as a futures descriptor, the attributes of that exchange element 232 are automatically parsed according to futures trading parameters and regulations. Accordingly, when the exchange element 232 is classified as a futures descriptor, related portions of the dynamically updated lookup table associated with futures are retrieved. For instance, when a client requests spread information, a subset of exchange elements 232 corresponding to the spreads descriptor are retrieved.

Block 640.

Referring to block 640 of FIG. 6C, in some embodiments the message comprises a trade summary message, a limits message, a top of book message, a best bid and ask message, or a sub-combination or combination thereof. However, the present disclosure is not limited thereto. The presently described constituents of the message include standard information of a client request. For instance, when a message is a top of book message, a highest bid and a lowest ask of a security are determined. When a message is a limits message, the message includes a confirmation of a limit order or a list of pending limit orders. In some embodiments, the list of pending limit orders is a list of pending limit orders of the client. In some embodiments, the list of pending limit orders is a list of pending limit orders of a security.

Block 642.

Referring to block 642 of FIG. 6C, the method further requires using the first query to obtain a market feed data packets. The market feed data packets are responsive to the first client request. Thus, the market feed data packets include information associated with the client request. The market feed data packets are encoded in accordance with the first exchange protocol 230, as determined by the electronic exchange 250. As previously described, market feed data packets comprise the information and data (e.g., exchange elements 232) of the electronic exchange 250 which the client requests.

Blocks 644 through 648.

Referring to blocks 644 and 648 of FIG. 6C, in some embodiments at least one market feed data packet includes a message of the MDP. In such embodiments, there is typically a one-to-many relationship between the message and the client request. Thus, the message includes the information requested by the client and information requested by different clients. In some embodiments, the at least one market feed data packet includes multiple messages of the MDP. In such embodiments, there is a many-to-one relationship between the message and the client request. Thus, the information requested by the client is spread across the multiple messages. In further embodiments, there is a one-to-one relationship between the message and the client request. Thus, the information requested by the client is contained in the message. In some embodiments, at least two market feed data packets collectively comprise a single event spread over the at least two market feed data packets. Each market feed data packet in the at least two market feed data packets comprises a complete message as defined by the FIX protocol of the MDP. Thus, in typical embodiments, the at least one market feed data packet comprises a message of the MDP which correlates to a client request to retrieve informational data of the electronic exchange 250. For instance, when a client requests a best bid and ask of a security, the message is of the MDP protocol since no market orders are being placed. As market events occur, messages are sent in real time market data feed packets. Within the market feed data packets and messages, event-based market data is sequentially communicated in accordance with the event occurrence. Thus, all messages of a first event will be processes and communicated prior to the processing and communication of messages of a second event. In some embodiments, a single event is represented by a series of messages communicated by multiple market feed data packets. Messages of an event will be disseminated in a predetermined order according to types. The exact relationship between the market feed data packets and the client requests are determined by an amount and/or type of information included in a corresponding client request, a number of active client requests, and a number of events.

Block 650.

Referring to block 650 FIG. 6C, in some embodiments the market feed data packets comprises an execution report, an acknowledgement, or a combination thereof. In such embodiments, the market feed data packets are in accordance with the DropCopy protocol.

Block 652.

Figure 6D:
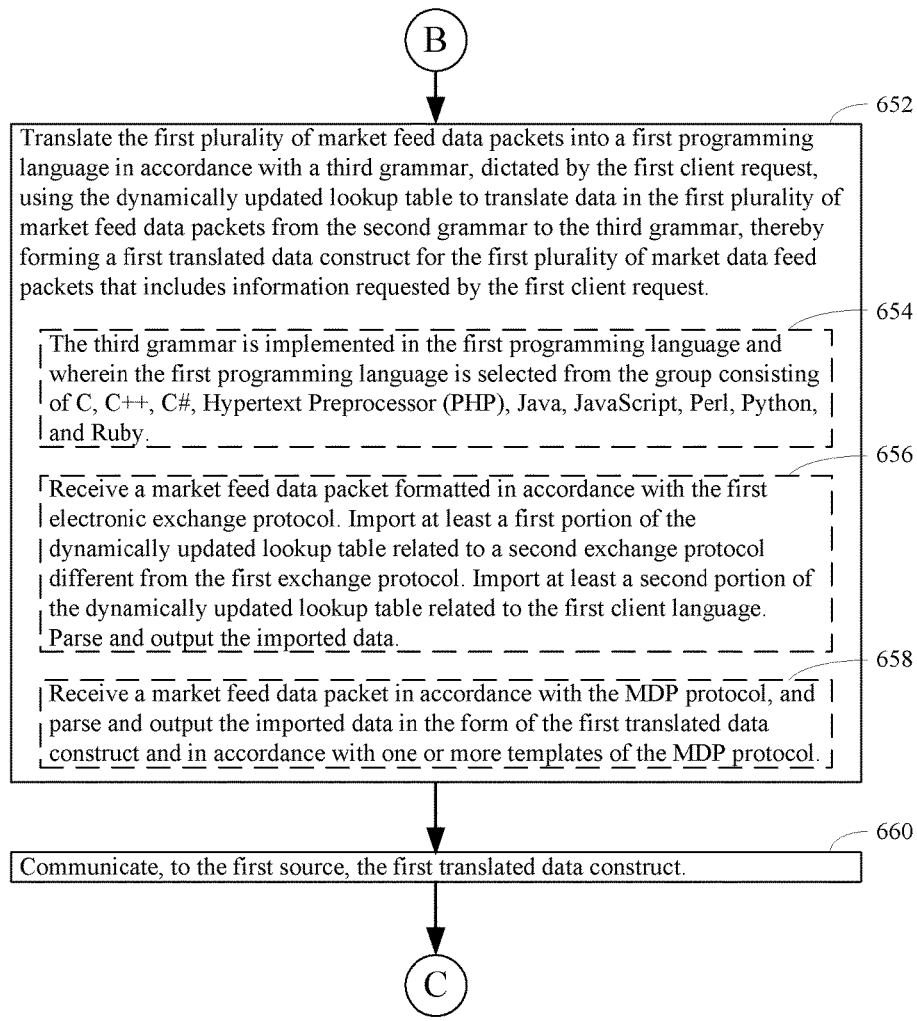

Referring to block 652 of FIG. 6D, the method translates the market feed data packets into a first programming language 238 in accordance with a third grammar 226. In other words, the method translates the market feed data packets into a data construct, and this data construct expresses the information in the market feed data packets in a first programming language 238, in accordance with a third grammar 226.

The programming language 238 is dictated by the first client request. For instance, when the market feed data packets are received in accordance with the MDP protocol 230 and a client request dictates JAVA programming language 228 as an output, the data and information of the market feed data packets are translated from MDP semantics 224-2 and grammar 226-2 to JAVA semantics 226-3 and syntax 22-6 in accordance with the methods of the present disclosure. The dynamically updated lookup table is used to translate data in the market feed data packets from the second grammar 226-2 to the third grammar 226-3. This forms a translated data construct for the market data feed packets. The translated data construct includes the information requested by the client request. In typical embodiments, at least a portion of the dynamically updated lookup table is organized by language type and grammar (e.g., language module 216). Translating from a first language (e.g., second client language 218-2) to a second language (e.g., fifth programming language 238-5) requires using relevant portions of the dynamically updated lookup table related to the first language and the second language. For instance, when a client requests price information of a security to be produced in Python and the electronic exchange protocol 230 is iLink, the portions of the dynamically updated lookup table related to Python (e.g., first programming language 238-1 of FIG. 3) and iLink protocol (e.g., first exchange protocol 230-1 of FIG. 3) are utilized.

Block 654.

Referring to block 654 of FIG. 6D, in some embodiments the third grammar 226 is implemented in the first programming language 238. In typical embodiments, the first programming language is C, C++, C#, Hypertext Preprocessor (PHP), Java, JavaScript, Perl, Python or Ruby. However, the present disclosure is not limited thereto. Adoption of new programming languages or updated programming languages is readily implemented by the present disclosure, as the dynamically updated lookup table is updated to include the new programming language 238 without modifying how the translation between languages (e.g., between client languages 218, programming languages 238, and protocols 230) is conducted.

Blocks 656 and 658.

Referring to blocks 656 and 658 of FIG. 6D, in some embodiments the method receives a market feed data packet formatted in accordance with the first electronic exchange protocol 230. At least a first portion of the dynamically updated lookup table related to a second exchange protocol different from the first exchange protocol (e.g., second exchange protocol 230-2) is imported. In some embodiments, all of the dynamically updated lookup table related to a second exchange protocol different from the first exchange protocol (e.g., second exchange protocol 230-2) is imported. In some embodiments, additionally, at least a second portion of the dynamically updated lookup table related to the first client language is imported. These imported portions are parsed. Then the imported data is outputted.

In some embodiments the method receives a market feed data packet in accordance with the MDP protocol 230. The imported data is parsed and output in the form of the translated data construct and in accordance with one or more templates of the MDP protocol 230. The importing, parsing, and outputting are described in more detail infra.

Block 660.

Referring to block 660 of FIG. 6D, the method communicates, to the first source (e.g., client device 102), the translated data construct. As previously described, a form of the communication between the electronic exchange 250, the trading system 200, and the client device 102 depends on a design of the present disclosure. For instance, in one implementation when a client request is a price of an entire market, the first translated data construct is communicated as a spreadsheet. In another implementation, when a client request is a top of book request to be received in Python, the first translated data construct is communicated in the form of Python code. In some embodiments, the code is precompiled. In some embodiments, the code is compiled upon communication of the translated data construct. In some embodiments, the code is in the form of an interpreter language or script language that does not get compiled.

Block 662.

Figure 6E:
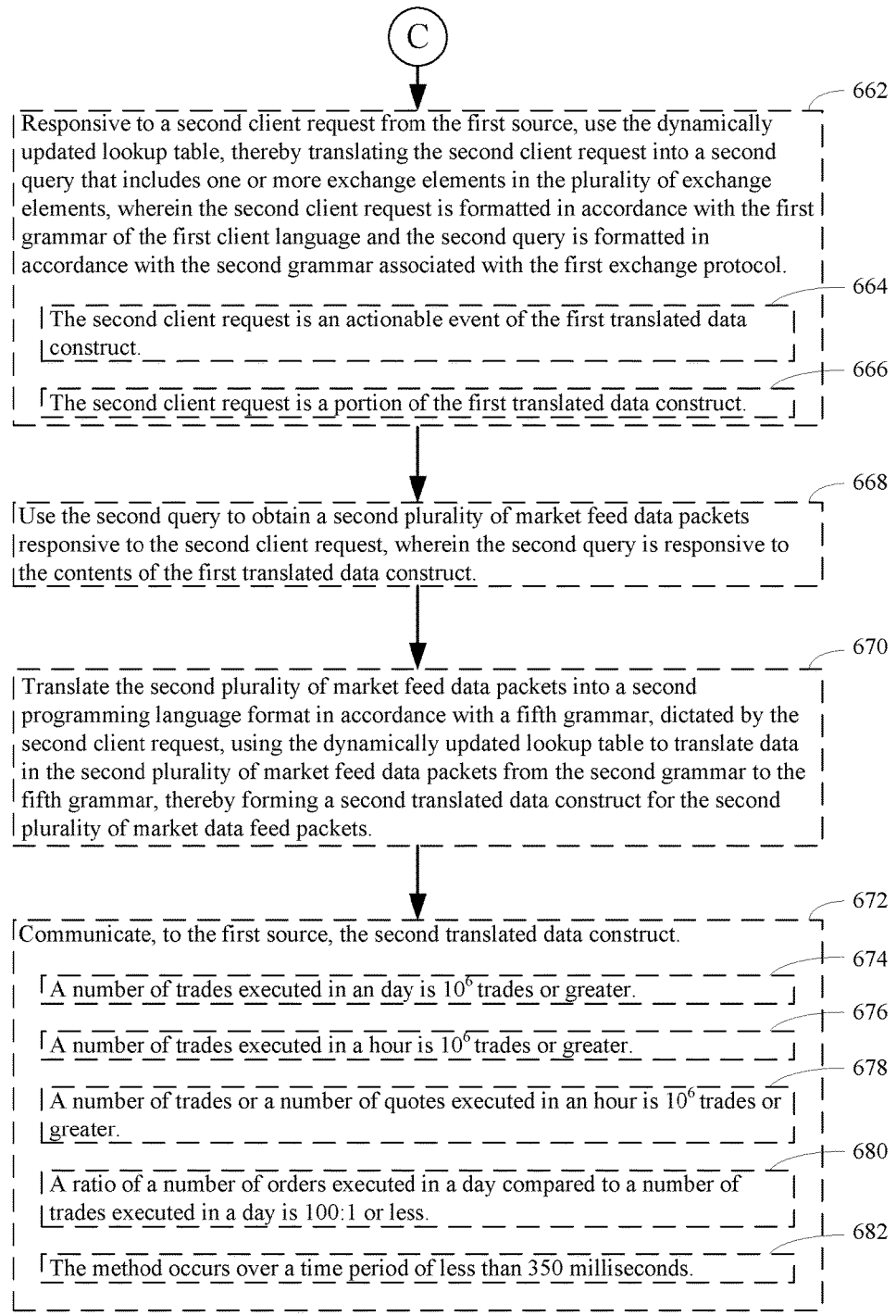

Referring to block 662 of FIG. 6E, in some embodiments the method is responsive to a second client request from the first source (e.g., client device 102-1). Using the dynamically updated lookup table, the method translates the second client request into a second query. The query includes one or more exchange elements 323. The second client request is formatted in accordance with the first grammar 226-1 of the first client language 218-1 and the second query is formatted in accordance with the second grammar 226-2 associated with the first exchange protocol 220-1. In some embodiments, the second client request is communicated from a second source (e.g., client device 102-2 of FIGS. 1 and 4), which is remote from the first computer system.

Block 664.

Referring to block 665 of FIG. 6E, in some embodiments the second client request is an actionable event of the first translated data construct. For instance, in one implementation when a first client request is a price of a security the second client request is an order of the security. In another implementation, when a first client request is a limit order of a security the second client request is an execution of the limit order of the security.

Block 666.

Referring to block 666 of FIG. 6E, in some embodiments the second client request is a portion of the first translated data construct. For instance, when the first translated data construct includes prices of a variety of securities of an electronic exchange 250, the second client request is an order of a single security from the variety of securities of the electronic exchange 250.

Block 668.

Referring to block 668 of FIG. 6E, in some embodiments the method uses the second query to obtain market feed data packets. These market feed data packets are responsive to the second client request. The second query is responsive to the contents of the first translated data construct. For instance, when the first translated data construct includes pending orders of a security, the second query is a query for trades of the security. In some embodiments, the second query and the second client request are initiated automatically (e.g., without human intervention) according to the results of the first client request and the first translated data construct. For instance, when the first client request is a limit order for a security (e.g., a limit order for fifty shares of stock V at a price of $1.23 per share), the second client request is an execution request of the limit order (e.g., execute the limit order for fifty shares of stock V at the price of $1.23 per share).

Block 670.

Referring to block 670 of FIG. 6E, in some embodiments the method translates the market feed data packets into a second programming language 238-2 format in accordance with a fifth grammar 226-5. The exact programming language 238 is dictated by the second client request. The dynamically updated lookup table is utilized to translate data in the market feed data packets from the second grammar 226-1 to the fifth grammar 226-5. This forms a second translated data construct for the market data feed packets. In some embodiments, the second translated data construct has the same form as the first translated data construct. For instance, when the first translated data construct is communicated in JAVA, the second translated data construct is communicated in JAVA. Similarly, in some embodiments, when the first translated data construct is communicated the form of the first translated data construct is stored and applied to the second translated data construct.

Block 672.

Referring to block 672 of FIG. 6E, in some embodiments the method communicates the second translated data construct to the first source (e.g., client device 102-1). In some embodiments, such as when the second client request is received from the second source (e.g., client device 102-2), the second translated data construct is communicated to the second source. As previously described, a form of the communication between the client device 102, the trading system 200, and the electronic exchange 250 depends on a design of the present disclosure. Typically, the communication of the second translated data construct is similar to the communication of the first translated data construct.

Blocks 674 through 680.

Referring to blocks 674 through 680 of FIG. 6E, in some embodiments a number of trades executed in an hour is $10^6$ trades or greater, $10^9$ trades or greater or $10^3$ trades or greater. In some embodiments, a number of trades executed in a day is $10^6$ trades or greater, $10^9$ trades or greater, or $10^3$ trades or greater. In some embodiments, a number of trades executed in a minute is $10^6$ trades or greater, $10^9$ trades or greater, or $10^3$ trades or greater.

In some embodiments, a ratio of a number of orders executed in a day compared to a number of trades executed in a day is 100:1 or less, 50:1 or less, or 250:1 or less. A number of trades, or orders, executed, or received, in a time period (e.g., minute(s), hour(s), day(s), year(s)) is related to a size of the electronic exchange, a trading volume of the electronic exchange, and/or other dynamic market forces such as world events. For instance, a major electronic exchange, such as the NYSE, can have a total volume of $10^6$ to $10^9$ for a single day. Likewise, a less active exchange, such as the Rwanda Stock Exchange (RSE), can have a total volume of 100 for a single day.

Block 682.

Referring to block 682 of FIG. 6E, in some embodiments the method occurs over a time period of less than 350 milliseconds (ms). In some embodiments, the method occurs over a time period of less than 250 ms. In some embodiments, the method occurs over a time period of less than 150 ms. As previously described, various aspects of the present disclosure are related to minimizing and optimizing a total amount of time required to communicate, receive, and interpret market feed data packets communicated by the electronic exchange 250. Thus, the elapsed time from when a client request is received to when a translated data construct is communicated is less than 350 ms.

Example I—Extracting MDP Message from the Plurality of Market Feed Data Packets in JAVA on the CME In this example embodiment, a query, which initiates from a client request, is used to obtain market feed data packets. The market feed data packets include multiple messages of the MDP (e.g., first exchange protocol 230 of FIG. 3) from the electronic exchange 250. In this example embodiment, the electronic exchange (e.g., electronic exchange 250 of FIG. 2) is the CME. The request also dictates a programming language (e.g., programming language 238 of FIG. 3), which is JAVA in this example embodiment. However, the present disclosure is not limited thereto as there are a variety of programming languages that are usable by the present disclosure. The portions of the dynamically updated lookup table associated with the programming language (e.g., language module 216 of FIG. 3) are retrieved in order to accomplish the translating. In the present example embodiment, MDP templates include a fifth version and a sixth version. Each template describes a format (e.g., semantic 220 and syntax 224) of the binary encoded messages. The goal of the present example embodiment is to provide a parsed version of the MDP message through the types and groups (e.g., exchange elements 232) of the CME 250 messages. The following is an example of code to receive and parse MDP messages from the CME 250:

```
package tech.arbitrage.cme.mdp3;
public
class CME Messages
{
  public
  static
  CME_Message GetNewMessage_FromTemplate( int version ,
    int template_id )
  {
    switch( version )
    {
      case 5:
        return
tech.arbitrage.cme.mdp3.messages_v5.CME_Messages.
GetNewMessage_FromTemplate(template_id);
      case 6:
      default:
        return
tech.arbitrage.cme.mdp3.messages_v6.CME_Messages.
GetNewMessage_FromTemplate(template_id);
    }
  }
}
```

The return on the 'GetNewMessage_FromTemplate' command yields:

```
package tech.arbitrage.cme.mdp3.messages_v5;
import tech.arbitrage.cme.mdp3.*;
import java.io.*;
public
abstract
class CME_Messages
{
  public
  static
  CME_Message GetNewMessage_FromTemplate( int id )
  {
    switch ( id )
    {
      case 4: // 2 ChannelReset4
        return new ChannelReset4( );
      case 12: // 3 AdminHeartbeat12
        return new AdminHeartbeat12( );
      case 15: // 4 AdminLogin15
        return new AdminLogin15( );
      case 16: // 5 AdminLogout16
        return new AdminLogout16( );
      case 27: // 6 MDInstrumentDefinitionFuture27
        return new MDInstrumentDefinitionFuture27( );
      case 29: // 7 MDInstrumentDefinitionSpread29
        return new MDInstrumentDefinitionSpread29( );
      case 30: // 8 SecurityStatus30
        return new SecurityStatus30( );
      case 32: // 9 MDIncrementalRefreshBook32
        return new MDIncrementalRefreshBook32( );
      case 33: // 10 MDIncrementalRefreshDailyStatistics33
        return new MDIncrementalRefreshDailyStatistics33( );
      case 34: // 11 MDIncrementalRefreshLimitsBanding34
        return new MDIncrementalRefreshLimitsBanding34( );
```

-continued

```
      case 35: // 12 MDIncrementalRefreshSessionStatistics35
        return new MDIncrementalRefreshSessionStatistics35( );
      case 36: // 13 MDIncrementalRefreshTrade36
        return new MDIncrementalRefreshTrade36( );
      case 37: // 14 MDIncrementalRefreshVolume37
        return new MDIncrementalRefreshVolume37( );
      case 38: // 15 SnapshotFullRefresh38
        return new SnapshotFullRefresh38( );
      case 39: // 16 QuoteRequest39
        return new QuoteRequest39( );
      case 41: // 17 MDInstrumentDefinitionOption41
        return new MDInstrumentDefinitionOption41( );
      case 42: // 18 MDIncrementalRefreshTradeSummary42
        return new MDIncrementalRefreshTradeSummary42( );
    }
    return null;
}
```

The first three lines of this code determine the electronic exchange 250 (e.g., CME) to communicate with, the exchange protocol 230 (e.g., MDP v5) which the electronic exchange 250 is implemented in accordance with, and the programming language to be output (e.g., JAVA) as dictated by the client request. The client request in this example is a request to retrieve new messages, which are a component of the market feed data packets, of the electronic exchange 250. In this example, a subset of exchange elements 232 (e.g., case 4, case 12, case 15, . . . , case 42) related to this request are retrieved, translated, and returned.

Example II—Returning a DropCopy Message in JAVA on the CME

In this example embodiment, data of a previous iLink protocol session is imported to the DropCopy protocol. In other words, a translated data construct of a first request is used as a portion of a second request. As previously described, the DropCopy protocol specifies an application message. In this example embodiment, a trade execution report is relayed. The imported data is then translated into a query, which is further translated and coded in JAVA. This is output and communicated to the first source accordingly.

```
package tech.arbitrage.cme.dropcopy40
import tech.arbitrage.cme.ilink.FixField
import java.nio.file.Files
. . .
  int colon_offset=line.indexOf(":")
  println(line+" "+colon_offset+" . . . ")
  ArrayList<FixField>fields=
FixField.GetEmbededFieldsIn(line.substring(colon_offset+
1));
  for (FixField field: fields)
  {
    println(""+field+" . . . ");
  }
```

The first line of this example code defines the electronic exchange 250 (e.g., CME) to be communicated with and the exchange protocol 230 (e.g., DropCopy 4.0) the electronic exchange 250 is implemented in accordance to. The relevant portions of the dynamically updated lookup table is then retrieved. The second line of code is utilized to import data from the previous iLink session in accordance with the DropCopy protocol. The programming language 238 (e.g., JAVA), which is dictated by the request, is defined in line three. The data is imported as an array, which means there is more than likely one or more trade requests, order included in an initial client request. This example code outputs:
->284230:8=FIX.
4.29=50535=n34=8369=21652=20160928-19:20:
58.21843=Y49=CME50=G56=PPVBBBN57=G122=
20160927-18:06:01.089143=US,
CA212=380213=<RTRF>8=FIX.
4.29=34435=834=2625369=262552=20160927-18:06:
01.08449=CME50=G56=C93000N57=DUMMY143=US,
IL1=005216=011=ACP147499956104714=017=99306:
2785620=037=992169480638=139=040=241=044=
991748=99826054=155=N$59=060=20160927-18:06:
01.083107=0GLBM7150=0151=1167=FUT432=
201609271028=Y1091=N5979=
147499956108338829997171=ACP147499956104710=
041</RTRF>10=004 8 . . .
_8_BeginString=FIX.4.2 . . .
_9_Bodylength=505 . . .
_35_MsgType=n . . .
_34_MsgSegNum=8 . . .
_369_LastMsgSegNumProcessed=216 . . .
_52_SendingTime=20160928-19:20:58.218 . . .
_43_PossDupFlag=Y . . .
_49_SenderComp1D=CME . . .
_50_SenderSub1D=G . . .
_56_TargetComp1D=PPVBBBN . . .
_57_TargetSub1D=G . . .
_122_OrigSendingTime=20160927-18:06:01.089 . . .
_143_=US, CA . . .
_212_XMLDataLen=380 . . .
_213_XMLData=<RTRF>8=FIX.
4.29=34435=834=2625369=262552=20160927-18:06:
01.08449=CME50=G56=C93000N57=DUMMY143=US,
IL1=005216=011=ACP147499956104714=017=99306:
2785620=037=992169480638=139=040=241=044=9917
48=99826054=155=N$59=060=20160927-18:06:
01.083107=OGLBM7150=0151=1167=FUT432=
201609271028=Y1091=N5979=147499956
10833882999717=ACP147499956104710=041</RTRF>
_10_CheckSum=004 . . .

The HTML data field portion, 4.29=344 . . . through=041</RTRF>, that encodes the iLink FIX trade message is simple to decode at this stage for one skilled in the art.

Example III—Market Data Incremental Book Refresh

Referring to FIG. 7, in this example embodiment, market data of the electronic exchange 250 (e.g., CME) is incrementally refreshed in a book. In this example embodiment, a message, which is a component of the market feed data packets, in the MDP 3.0 protocol (e.g., the exchange protocol 230) is parsed according to a fifth template of the MDP. The message is then parsed according to the JAVA language grammar (e.g., grammar 226 of programming language 238 of FIG. 3), which is dictated by the client request.

Referring to FIG. 7A, lines 1 through 5 refer to importing relevant portions of the dynamically updated lookup table related to the exchange 250. For instance, line 1 specifies that the electronic exchange (e.g., electronic exchange 250 of FIGS. 1 and 2) is the CME, the exchange protocol (e.g., first exchange protocol 230-1 of FIG. 3) which the electronic exchange is implemented in accordance with is MDP 3.0, and the exchange elements (e.g., exchange elements 232 of FIG. 3) comprise a message of the MDP in a fifth template format. Thus, the portions of the dynamically updated lookup table (e.g., language module 216 and exchange protocol module 228) associated with these are retrieved. In this example, and as dictated by lines 7 through 11, the client request is a request to incrementally refresh a book. Lines 14 through 80 define the groups, types, and exchange elements 232 to be obtained by the request. These lines also define specific conditions and logic parameters of the request. For instance, lines 61 through 63 detail scenarios when the exchange protocol 230 is incorrectly defined. For example, when a client communicates a request to a first electronic exchange 250-1, but accidentally sends the request to a second electronic exchange 250-2, an error message is returned. Similarly, lines 78 and 79 detail scenarios when the message includes information from multiple client requests. In some embodiments, this is due to receiving a variety of requests from various client devices (e.g., client device 102-1, client device 102-3, and client device 102-N). In some embodiments, this is due to receiving a variety of simultaneous request from a single client device 102.

Referring to FIG. 7C, lines 118 through 125 detail the information to be extracted from the market feed data packets, including, but not limited to, an entry price, an entry size, and an aggregate number of orders at a corresponding price level. Referring to FIGS. 7C and 7D, lines 148 through 214 compile, translate, and output the extracted information. In this example, as defined by lines 197-203, the information is output as a list.

Figure 8A:
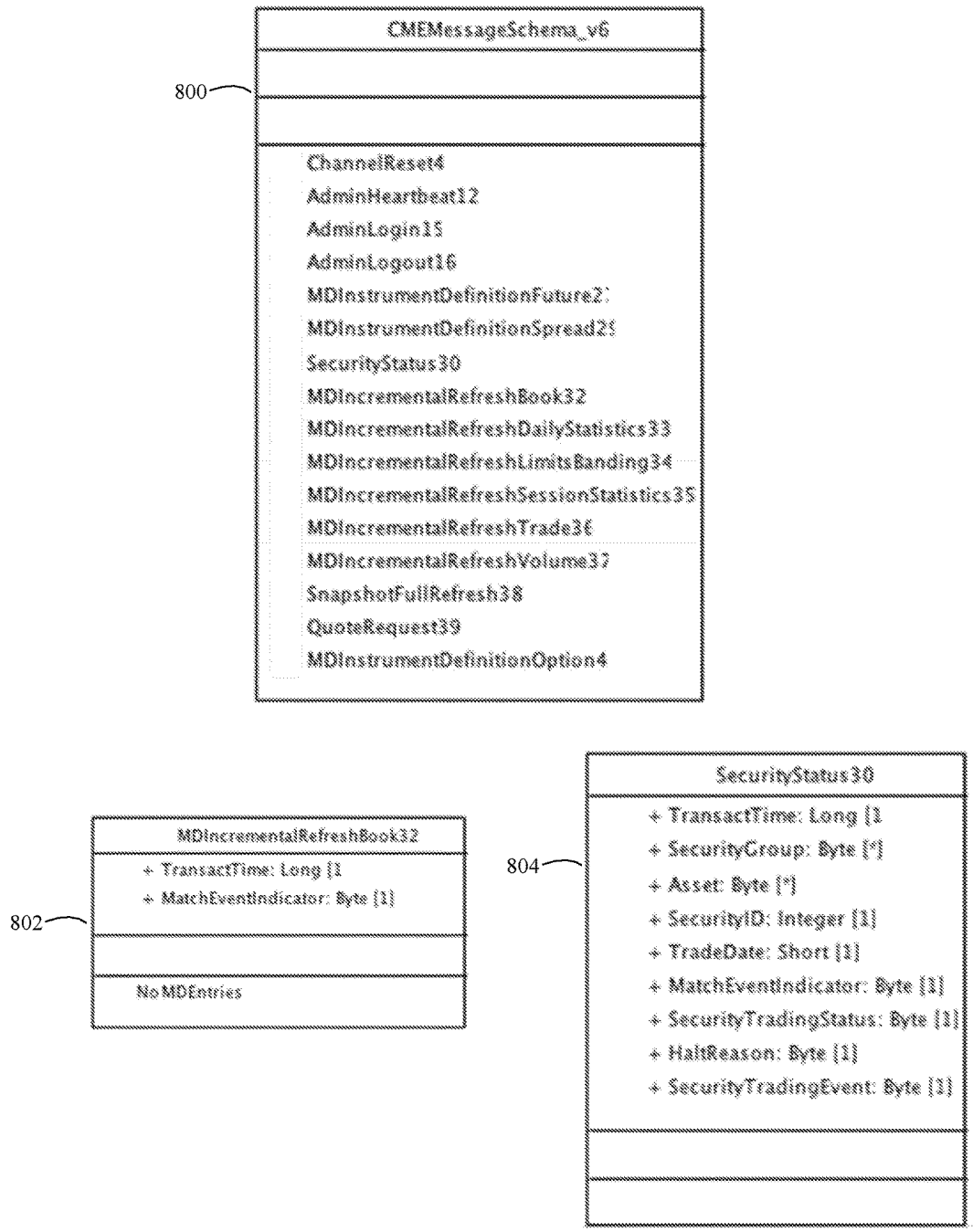

Example IV—Selections of the MDP Portion of the Dynamically Updated Lookup Table Referring to FIG. 8, in this example embodiment, a variety of portions (e.g., exchange elements 232) of the dynamically updated lookup table related to the MDP (e.g., exchange protocol 230) are disclosed. In the dynamically updated lookup table, a header of each column (e.g., CMEMessageSchema_v6 of portion 802) refers to the type, and the constituent components are the group (e.g., ChannelReset4, AdminHeartbeat12 of portion 802). Portion 806 defines the options descriptor in the MDP portion of the dynamically updated lookup table, while portion 808 defines the future descriptor in the MDP portion of the dynamically updated lookup table (e.g., exchange protocol 230-1 of exchange protocol module 228). When the dynamically updated lookup table is updated, relevant portions of the lookup table associated with the update need to be amended. The types, groups, and portions illustrated in FIG. 8 are exemplary and are not meant to limit the present disclosure thereto.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A computer implemented method comprising:
   at an electronic exchange operated on a first computer system and implemented in accordance with a first exchange protocol, wherein the first exchange protocol includes a plurality of exchange elements:
(A) responsive to a first client request, from a first source remote from the first computer system, using a dynamically updated lookup table provided from a second source other than the first source, the dynamically updated lookup table including a respective descriptor for each exchange element in at least a subset of the plurality of exchange elements of the first exchange protocol, translating the first client request into a first query for one or more exchange elements in the plurality of exchange elements, wherein the first client request is formatted in accordance with a first grammar of a first client language and the first query is formatted in accordance with a second grammar associated with the first exchange protocol;
(B) using the first query to obtain a first plurality of market feed data packets responsive to the first client request, wherein the first plurality of market feed data packets is encoded in accordance with the second grammar of the first exchange protocol;
(C) translating the first plurality of market feed data packets into a first programming language in accordance with a third grammar of the first programming language, which is dictated by the first client request, using the dynamically updated lookup table to translate data in the first plurality of market feed data packets from the second grammar of the first exchange protocol to the third grammar of the first programming language, thereby forming a first translated data construct for the first plurality of market feed data packets that includes information requested by the first client request; and
(D) communicating, to the first source, the first translated data construct.

2. The method of claim 1, wherein the electronic exchange is selected from the group consisting of a commodities exchange, a cryptocurrency exchange, a currency exchange, a dark pool, an energy exchange, an electronic communication network, a foreign exchange, a real estate exchange, a stock exchange, market participants, or an alternative investment exchange.

3. The method of claim 1, wherein the first client request is in the form of an application programming interface call.

4. The method of claim 1, wherein the first exchange protocol is a financial information exchange (FIX) protocol or a FIX Adapted for Streaming (FAST) protocol, wherein the FIX protocol and the FAST protocol each define a message header, a simple binary header, and a FIX message body.

5. The method of claim 1, wherein:
the first exchange protocol is a market data platform (MDP), and
a market feed data packet in the first plurality of market feed data packets comprises a message that includes event-based bid data, ask data, trade data, statistical data, or a combination thereof.

6. The method of claim 5, wherein:
the plurality of exchange elements comprises a plurality of types, and
the plurality of types comprises one or more of the group consisting of currency type, trading symbol, quantity type, price type, security exchange type, text type, and group-size type.

7. The method of claim 5, wherein at least one market feed data packet in the first plurality of market feed data packets comprises a message of the MDP.

8. The method of claim 5, wherein at least one market feed data packet in the first plurality of market feed data packets comprises a plurality of messages of the MDP.

9. The method of claim 5, wherein
at least two market feed data packets in the first plurality of market feed data packets collectively comprise a single event over the at least two market feed data packets, and
each market feed data packet in the at least two market feed data packets comprises a complete message as defined by the FIX protocol of the MDP.

10. The method of claim 7, wherein the using the dynamically updated lookup table comprises providing a decompiled version of the message in the form of the first translated data construct.

11. The method of claim 7, wherein the using the dynamically updated lookup table comprises providing a summarized version of the message in the form of the first translated data construct.

12. The method of claim 7, wherein the message comprises a trade summary message, a limits message, a top of book message, a best bid and ask message, or a combination thereof.

13. The method of claim 5, wherein the respective descriptor for an exchange element of the plurality of exchange elements comprises a futures descriptor, a spread descriptor, or an options descriptor.

14. The method of claim 5, wherein the using (A), using (B), and translating (C) collectively comprise commands for:
(i) receiving a market feed data packet in accordance with the MDP protocol, and
(ii) parsing and outputting the imported data in the form of the first translated data construct and in accordance with one or more templates of the MDP protocol.

15. The method of claim 5, wherein the using (A), using (B), and translating (C) collectively comprise commands for:
(i) receiving a market feed data packet in accordance with the MDP protocol,
(ii) importing at least a first portion of the dynamically updated lookup table related to the MDP protocol,
(iii) importing at least a second portion of the dynamically updated lookup table related to the first client language, and
(iv) parsing and outputting the imported data in the form of the first translated data construct.

16. The method of claim 5, wherein the first exchange protocol specifies that:
the first client connects to and transacts with the electronic exchange by creating a session,
the session is defined by a password, at least one Internet Protocol (IP) address, a port, a market identifier, and a sender identifier, and
a message is an administrative message configured to support connectivity between the first client and the electronic exchange, or an application message configured to support transactions on the electronic exchange.

17. The method of claim 16, wherein the first client request comprises a request to enter an order, a request to execute an order, a request to modify an order, a request to cancel an order, or a combination thereof.

18. The method of claim 16, wherein the using (A), using (B), and translating (C) collectively comprise commands for:
(i) receiving a market feed data packet formatted in accordance with the first exchange protocol, (ii) importing at least a first portion of the dynamically updated lookup table related to a second exchange protocol different than the first exchange protocol, (iii) importing at least a second portion of the dynamically updated lookup table related to the first client language, and (iv) parsing and outputting the imported data in the form of the first translated data construct.

19. The method of claim 1, wherein the first exchange protocol is DropCopy that specifies a message is an application message comprising a trade execution report, an order entry acknowledgement, or a combination thereof.

20. The method of claim 19, wherein the first plurality of market feed data packets comprises an execution report, an acknowledgement, or a combination thereof.

21. The method of claim 19, wherein the using (A), using (B), and translating (C) collectively comprise commands for:

(i) receiving a market feed data packet formatted in accordance with the DropCopy protocol, (ii) importing at least a first portion of the dynamically updated lookup table related to the DropCopy protocol, (iii) importing at least a second portion of the dynamically updated lookup table related to the first client language, and (iv) parsing and outputting the imported data in the form of the first translated data construct.

22. The method of claim 1, wherein the dynamically updated lookup table is updated in response to an update of the first exchange protocol.

23. The method of claim 1, wherein the dynamically updated lookup table is updated in response to an update of the first exchange protocol without altering the first grammar of the first client language.

24. The method of claim 1, the method further comprising updating the dynamically updated lookup table on a recurring basis to reflect changes in the second grammar over time.

25. The method of claim 1, wherein the method further comprises:

(E) responsive to a second client request from the first source, using the dynamically updated lookup table, thereby translating the second client request into a second query that includes one or more exchange elements in the plurality of exchange elements, wherein the second client request is formatted in accordance with the first grammar of the first client language and the second query is formatted in accordance with the second grammar associated with the first exchange protocol;

(F) using the second query to obtain a second plurality of market feed data packets responsive to the second client request, wherein the second query is responsive to the contents of the first translated data construct;

(G) translating the second plurality of market feed data packets into a second programming language format in accordance with a fifth grammar, dictated by the second client request, using the dynamically updated lookup table to translate data in the second plurality of market feed data packets from the second grammar to the fifth grammar, thereby forming a second translated data construct for the second plurality of market feed data packets; and (H) communicating, to the first source, the second translated data construct.

26. The method of claim 25, wherein the second client request is an actionable event of the first translated data construct.

27. The method of claim 25, wherein the second client request is a portion of the first translated data construct.

28. A computer system comprising:

one or more processing units;

a controller;

a communications interface;

a power supply; and a memory, coupled to at least one of the one or more processing units, the memory storing a compiler, the compiler executed by at least one of the one or more processing units, the compiler comprising instructions for:

at an electronic exchange operated on a first computer system and implemented in accordance with a first exchange protocol, wherein the first exchange protocol includes a plurality of exchange elements:

(A) responsive to a first client request, from a first source remote from the first computer system, using a dynamically updated lookup table provided from a second source other than the first source, the dynamically updated lookup table including a respective descriptor for each exchange element in at least a subset of the plurality of exchange elements of the first exchange protocol, translating the first client request into a first query for one or more exchange elements in the plurality of exchange elements, wherein the first client request is formatted in accordance with a first grammar of a first client language and the first query is formatted in accordance with a second grammar associated with the first exchange protocol;

(B) using the first query to obtain a first plurality of market feed data packets responsive to the first client request, wherein the first plurality of market feed data packets is encoded in accordance with the second grammar of the first exchange protocol;

(C) translating the first plurality of market feed data packets into a first programming language in accordance with a third grammar of the first programming language, which is dictated by the first client request, using the dynamically updated lookup table to translate data in the first plurality of market feed data packets from the second grammar of the first exchange protocol to the third grammar of the first programming language, thereby forming a first translated data construct for the first plurality of market feed data packets that includes information requested by the first client request; and (D) communicating, to the first source, the first translated data construct.

29. A non-transitory computer readable storage medium for interpreting exchange data, wherein the non-transitory computer readable storage medium stores instructions, which when executed by a device compressing one or more processors, causes the one or more processors to perform a method comprising:

at an electronic exchange operated on a first computer system and implemented in accordance with a first exchange protocol, wherein the first exchange protocol includes a plurality of exchange elements:

(A) responsive to a first client request, from a first source remote from the first computer system, using a dynamically updated lookup table provided from a second source other than the first source, the dynamically updated lookup table including a respective descriptor for each exchange element in at least a subset of the plurality of exchange elements of the first exchange protocol, translating the first client request into a first query for one or more exchange elements in the plurality of exchange elements, wherein the first client request is formatted in accordance with a first grammar of a first client language and the first query is formatted in accordance with a second grammar associated with the first exchange protocol;

(B) using the first query to obtain a first plurality of market feed data packets responsive to the first client request, wherein the first plurality of market feed data packets is encoded in accordance with the second grammar of the first exchange protocol;

(C) translating the first plurality of market feed data packets into a first programming language in accordance with a third grammar of the first programming language, which is dictated by the first client request, using the dynamically updated lookup table to translate data in the first plurality of market feed data packets from the second grammar of the first exchange protocol to the third grammar of the first programming language, thereby forming a first translated data construct for the first plurality of market feed data packets that includes information requested by the first client request; and (D) communicating, to the first source, the first translated data construct.

* * * * *